United States Patent
Wang et al.

(10) Patent No.: US 7,155,463 B1
(45) Date of Patent: Dec. 26, 2006

(54) SYSTEM AND METHOD FOR REPLICATION OF ONE OR MORE DATABASES

(75) Inventors: Yao Wang, Shrewsbury, MA (US); Yun Wang, Shrewsbury, MA (US); David Kendler, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 09/957,278

(22) Filed: Sep. 20, 2001

(51) Int. Cl.
*G06F 17/00* (2006.01)

(52) U.S. Cl. .................. 707/204; 707/203; 707/102; 707/103 R; 707/104.1

(58) Field of Classification Search .................. 707/1, 707/6, 102, 104.1, 103 R, 271, 105
See application file for complete search history.

(56) References Cited

U.S. PATENT DOCUMENTS

| | | | |
|---|---|---|---|
| 5,206,939 A | | 4/1993 | Vishlitzky et al. |
| 5,544,347 A | * | 8/1996 | Yanai et al. ............ 711/162 |
| 5,742,792 A | * | 4/1998 | Yanai et al. ............ 711/162 |
| 5,758,359 A | * | 5/1998 | Saxon .................. 707/204 |
| 5,790,546 A | | 8/1998 | Dobbins et al. |
| 6,028,841 A | | 2/2000 | Lyon et al. |
| 6,049,853 A | * | 4/2000 | Kingsbury et al. ...... 711/147 |
| 6,092,066 A | * | 7/2000 | Ofek .................... 707/10 |
| 6,101,497 A | * | 8/2000 | Ofek .................... 707/10 |
| 6,209,002 B1 | * | 3/2001 | Gagne et al. ........... 707/204 |
| 6,230,203 B1 | | 5/2001 | Koperda et al. |
| 6,256,628 B1 | * | 7/2001 | Dobson et al. .......... 707/6 |
| 6,408,005 B1 | | 6/2002 | Fan et al. |
| 6,449,647 B1 | | 9/2002 | Colby et al. |
| 6,463,454 B1 | * | 10/2002 | Lumelsky et al. ....... 709/105 |
| 6,469,991 B1 | | 10/2002 | Chuah |
| 6,546,014 B1 | | 4/2003 | Kramer et al. |
| 6,563,829 B1 | | 5/2003 | Lyles et al. |
| 6,618,704 B1 | * | 9/2003 | Kanevsky et al. ....... 704/271 |
| 6,622,263 B1 | * | 9/2003 | Stiffler et al. .......... 714/13 |

\* cited by examiner

*Primary Examiner*—Charles Rones
*Assistant Examiner*—Sana AL-Hashemi
(74) *Attorney, Agent, or Firm*—Krishnendu Gupta; Robert Kevein Perkins

(57) ABSTRACT

This invention is a system and method for managing replication of data in a data storage environment by grouping logical devices. The system is enabled for configuring, monitoring, and controlling replication processes in accordance with a replication policy that is particularly useful when combined with grouping of logical devices used in replication. The invention is useful for replicating essentially an entire copy of a production-level database such that the copy may be used essentially as the production-level database itself.

25 Claims, 17 Drawing Sheets

CHECKPOINT DEVICE SET GROUP

REPLICATION GROUP

SYSTEM AND METHOD FOR REPLICATION OF ONE OR MORE DATABASES

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to management of data replication in a data storage environment, and more particularly to a system and method for management of devices and data associated with data replication across a plurality of storage devices.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices, typically disks housed in a single enclosure or cabinet. This array of storage devices is typically connected to several computers or host processors over a network or via dedicated cabling. Such a model allows for the centralization of data that is available to many users but creates a critical hub for operations.

Recently, disk redundancy has evolved as an alternative or complement to historical backups of the information stored on this critical hub. Generally speaking, in a redundant system having at least two storage devices, such as disk storage devices, data is copied or replicated and stored in more than one place. This allows the data to be recovered if one storage device becomes disabled.

In a basic approach, a first disk storage device stores the data and a second disk storage device stores a mirror image of that data. Whenever a data transfer is made to the first disk storage device, the data is also transferred to the second disk storage device. Typically, separate controllers and paths interconnect the two disk storage devices to the remainder of the computer system.

The concept of disk redundancy has been extended to environments wherein disks targeted for copying and storage of information are located remote to the source or primary disk. Remote redundancy provides further protection for data integrity because if a disaster or other unfortunate event renders the primary data unusable the remotely located target is much more likely to be unaffected than locally located disks.

Such redundancy may also be useful for reasons other than data backup. Uses include creating test environments with production data, or even creating alternative production sites for use while the primary production site is not available.

It is clear that there are many advantages gained by replicating data from primary or source disks to secondary or target disks. On the other hand, as the number of places used for data replication grows the complexity inherently increases. As the complexity increases the cost and problems of managing the data and associated devices grows and typically in an explosive fashion. The problem is exacerbated by the increasing difficulty of finding skilled information technology professionals, who are in short supply but ample demand.

What is needed is a tool that allows for adequate management of multiple devices used for data replication and the data itself but while maintaining ease of use and not requiring high degrees of experience and knowledge regarding information technology. Further it would be an advantage if such an easy to use management tool could allow for replication of entire application software and associated data, particularly with regard to databases which are ubiquitous and critical in major commercial environments.

SUMMARY OF THE INVENTION

The present invention is a system and method for management of data replication in a data storage environment. It is useful for managing replication of data in a data storage environment by grouping logical devices. The system is enabled for configuring, monitoring, and controlling replication processes in accordance with a replication policy that is particularly useful when combined with grouping of logical devices used in replication.

In one embodiment the invention include a method of grouping of logical devices includes further grouping of replication groups which may contain one or more logical device groups. In another embodiment the method further includes grouping of remote device groups which include one or more logical device groups and may include one or more replication groups. Such replication groups may also be grouped at a higher level by application groups and/or host groups according to selectable criteria.

In another embodiment, the invention is useful for replicating essentially an entire copy of a production-level database such that the copy may be used essentially as the production-level database itself. The database may be replicated locally or remotely with replication management tools provided with this invention and which ease such a function from complexity present in prior art techniques.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in data storage systems, such as the Symmetrix Integrated Cache Disk Array system available from EMC Corporation of Hopkinton, Mass. Specifically, this invention is directed to methods and apparatus for use in systems of this type that include transferring a mirrored set of data from a standard device to a redundant device for use in applications such as backup or error recovery, but which is not limited to such applications. The present invention addresses a problem of managing operations when one or more redundant devices are used and one or more of such devices may be remotely located from the standard device.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

The logic for carrying out the method is embodied as part of the system described below beginning with reference to FIGS. 1 and 3, and which is useful for carrying out a method described with reference to FIGS. 6–9 below. For purposes of illustrating the present invention, the invention is described as embodied in a specific configuration and using special logical arrangements shown in FIGS. 10–13, but one skilled in the art will appreciate that the device is not limited to the specific configuration but rather only by the claims included with this specification.

Data Storage Environment Including Logic for this Invention

Figure 1:
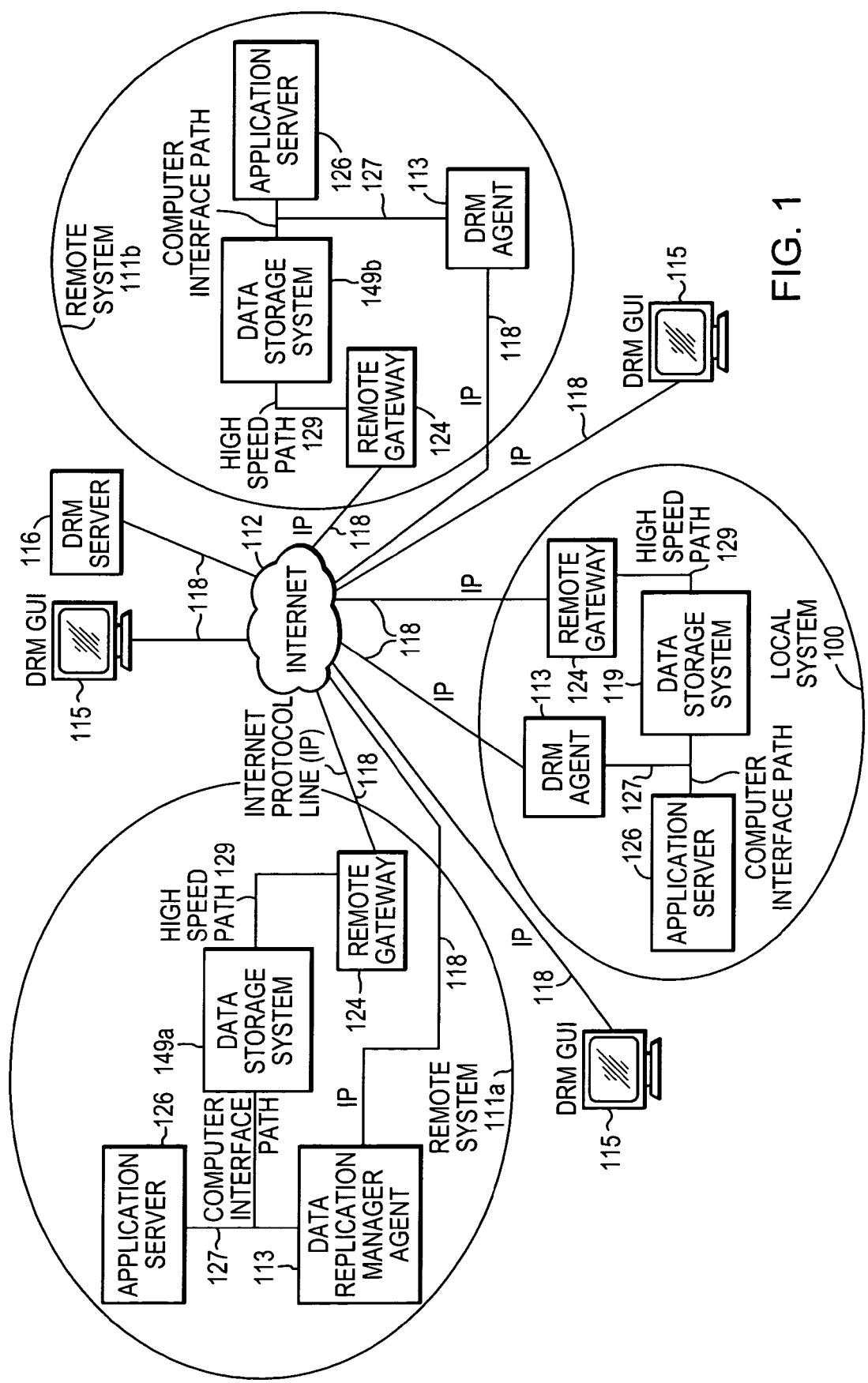
FIG. 1 is a block diagram of a networked computer system including at least one data storage system and having logic for enabling the present invention.

Referring now to FIG. 1, reference is now made to an environment in which the invention is particularly useful and includes a local system 100 and remote systems 111a–b. One skilled in the art will recognize that the invention is useful with any number of remote systems (including only one) but two are shown for simplicity and convenience. Local and remote systems each include, respectively, a data storage system 119 (also referred to as "source" or "primary" system) and remote data storage systems 149a–b (also referred to as "target" or "secondary" system). Each of these respective data storage systems 119 and 149a–b are in a preferred embodiment each Symmetrix Integrated Cache Disk Arrays available from EMC Corporation of Hopkinton, Mass. Such data storage systems and their implementations are fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

For purposes of this invention it is sufficient to understand that the remote systems 149a–b have mirrored devices that normally act as a mirror of the local system 119 on a volume-by-volume basis and that the volumes can by physical volumes, although logical volumes are preferred. Devices and volumes in a logical sense are also used interchangeably throughout. Note also that throughout document, like symbols and identical numbers represent like and identical elements in the Figures.

Figure 2:
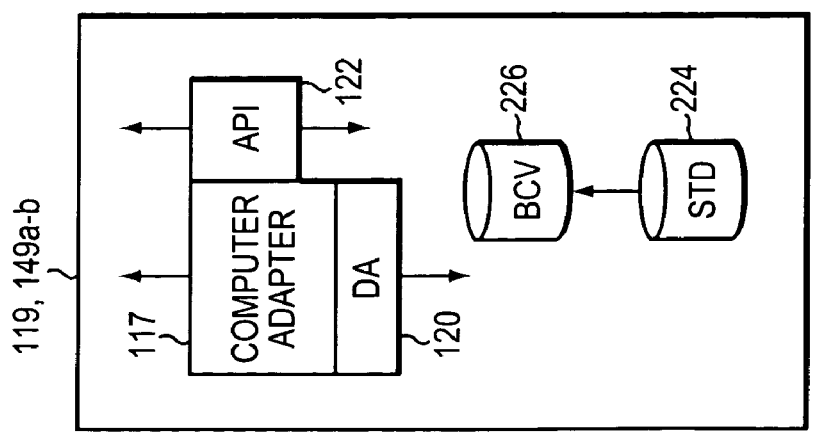
FIG. 2 is a logical block diagram schematic of at least one of the data storage systems of FIG. 1.

Although the invention is particularly useful in an environment employing a local and remote data storage system, it will become apparent upon reading this specification, the invention is also useful in a local system itself using replication to a local volume. In a preferred embodiment such a local volume is denoted as a business continuance volume (BCV) is employed (FIG. 2). Such a local system which employs mirroring for allowing access to production volumes while performing backup is also described in the '497 patent incorporated herein. Also, the invention is useful in an environment that employs local redundant volumes such as BCV's while also employing redundant remote volumes which themselves may be replicated locally as BCV's that are synchronized with the redundant remote volumes on the remote system itself.

FIG. 2 shows a preferred logical configuration of each Data Storage System 119, and 149a–b, each of which includes data storage devices that may be logically configured as a standard device (STD) 224 and a mirror of the STD denoted as BCV device 226. Each of these logical devices may be made available and addressable to a host or other computer through a host or Computer Adapter 117 and a device adapter (DA) 120. An Application Program Interface (API) 122 allows communication from one or more Data Replication Manager (DRM) Agents 113 to the logical devices in a preferred embodiment (See FIG. 3). The DRM Agent may act as a host computer to manage replication between a STD device and a BCV device on a Data Storage System.

Returning again to FIG. 1, an internet network cloud 112 interconnects the local system 100, remote systems 111a–b, DRM graphical user interface units (GUI) 115, DRM Agents 113, and DRM Server 116. The physical separation between the local system 100 and the remote systems 111a–b may be hundreds or thousands of kilometers, since it may via the internet. Each system 100, 111a, and 111b has at least one internet protocal (IP) communication line 118 over which communications are directed to the internet. Each system has a remote gateway 124 which essentially re-arranges data into data packets in accordance with the internet protocol. A high speed path 129 such as ESCON or Fibre Channel provides a communication link between each data storage system and the respective gateway.

FIG. 1 shows the Data Storage System 119 in communication with a data replication management (DRM) agent 113 for managing replication in the interconnected systems. Similar DRM agents 113 are in respective communications with each Remote Data Storage System 149a–b. Each DRM Agent is in further communication with a DRM GUI 115 that in turn interfaces with Server 116 and each Agent. Each Agent and the Server is interconnected by an IP line and the IP network. The arrangement is convenient but each Agent and the Server may be arranged in a variety of ways, including separated or combined.

Figure 3:
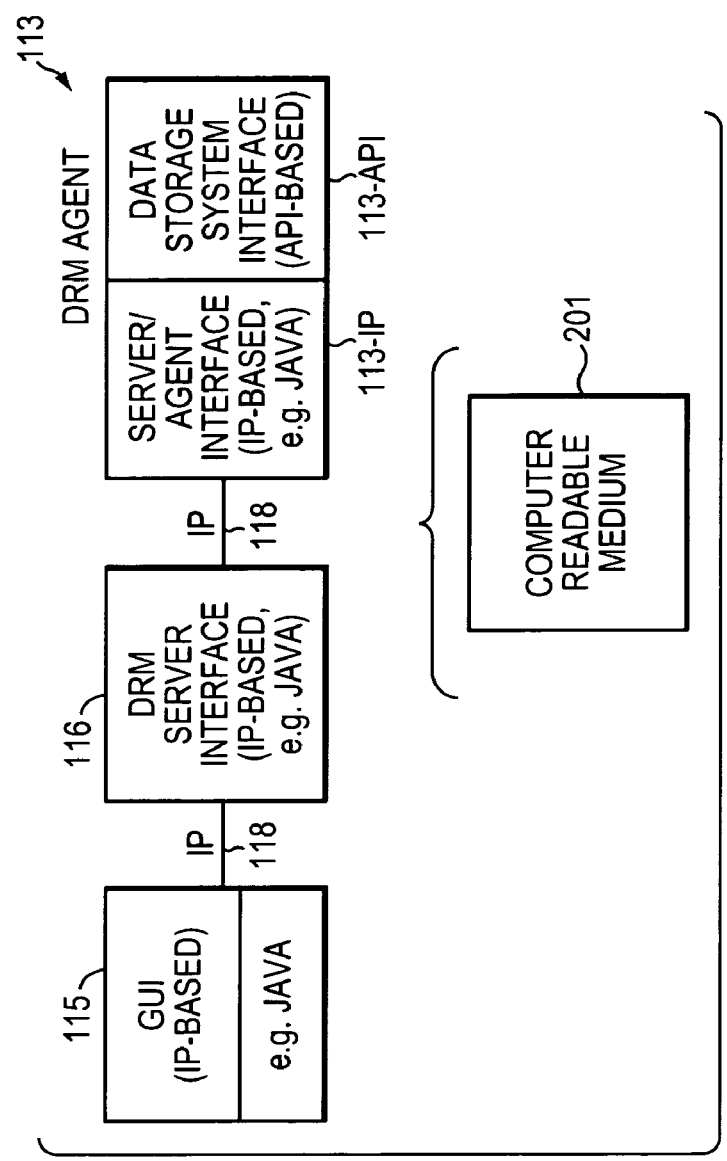
FIG. 3 is an exemplary representation of a preferred architecture of the logic of the invention (FIG. 1) and a computer-readable medium that may be encoded with at least a part of the logic for enabling the method of the present invention.

A preferred structure of the Agent, User Interface, and Server architectural relationship is shown in a simplified schematic block diagram in FIG. 3. Each Agent and Server in a preferred embodiment comprises software, such as C++ code stored and running in a digital computer, and which may be included in whole or in part on a computer readable medium such as medium 201, which could also contain in whole or part the code for the GUI. The GUI 115 that is preferably IP-based, e.g. via a Java written code is connected via IP line 118 to the DRM Server 116 through Java-based code. The DRM Server is connected via IP line 118 to one or more DRM Agents 113, which each communicate through an IP-based interface 113-IP (such as Java program code) and to each Data Storage System by including an API-based interface 113-API to the API 122 in each such Data Storage System.

Referring again to FIG. 1, the local system 100 and the remote systems 149a–b includes an Application Server 126 that may operate an application such as an Oracle database. Each Application Server 126 is in communication with each respective Data Storage System that is located within the same local or remote system through a high-speed computer interface 127, e.g., the well-known Small Computer System Interface (SCSI). Each Application Server is also linked to each respective DRM Agent within its similar realm through such a SCSI interface. The Application Server may be at least a part of a well-known computer, such as a personal computer.

The local system 100 and remote systems 149a–b comprise major components including data storage facilities 119 and 149a–b, respectively, which each have multiple data storage devices or data stores, and each of which are represented in whole or part as logical volumes, such as the BCV devices discussed above. In a preferred embodiment the storage devices are disk storage devices arranged in a array, such as that available with the Symmetrix Integrated Cache Disk Array from EMC of Hopkinton, Mass.

The host or computer adapter 117 provides communications between the DRM Agents 113 and the device adapters (DA) 120 and provide pathways between system memory (not shown, but conventional electronic cache memory) and the storage devices. In a preferred embodiment, a Remote Data Facility Adapter (not shown but discussed in incorporated '497 patent) as part of each Data Storage System provides access to the DRM Remote Gateways and provides Local System 100 access to the storage devices on the Remote Systems 111a–b and with the assistance of the Agents for managing replication.

A Logic for carrying out the methods of this invention are preferably included as part of the DRM Agents, the Server, and the GUI but one skilled in the computer arts will recognize that the logic, which may be implemented interchangeably as hardware or software may be implemented in various fashions in accordance with the teachings herein.

Generally speaking, the local system 100 operates in response to commands from one or more computers, such as the DRM Agent 113, that a connected host or Computer Adapter 117 receives. The computer adapter transfers commands to a command buffer that is part of the data storage system's memory. The command buffer stores data structures and write requests that the DA 120 generates. The device adapter responds by effecting a corresponding operation using the information in a command buffer and then initiates a data operation.

Logical Devices in the Preferred Environment

Examples of the use of logical devices in the preferred environment that are sometimes referred to as mirrors because they are used for replication and often including duplication is now given in FIGS. 4A–E. The invention is useful with any type of mirroring devices for managing replication, but the preferred mirroring devices are available from EMC in association with a Symmetrix Data Storage System and are described in the incorporated '497 patent.

FIGS. 4A–E depicts DRM Agent 113 managing mirrored logical volumes that may be operated on by an application under control of Application Server 126. In the context of a set of application programs, a Volume A application 221 could represent an application that operates on a data set in a logical Volume A and a Volume B application 222 could represent a backup application.

Figure 4A:
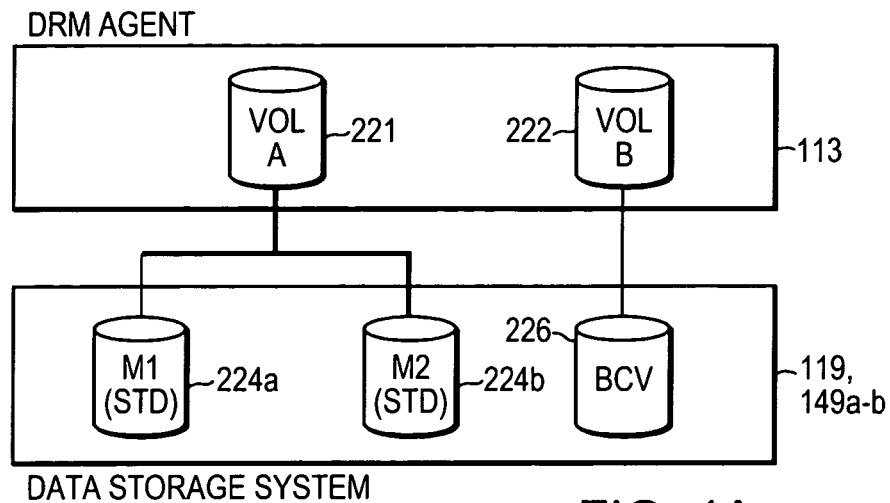
FIG. 4A is a representation of a configuration of the computer system of FIG. 1 in which the invention may be configured and operate with mirrored logical devices denoted as standard (STD) and BCV devices in a preferred embodiment.
Figure 4B:
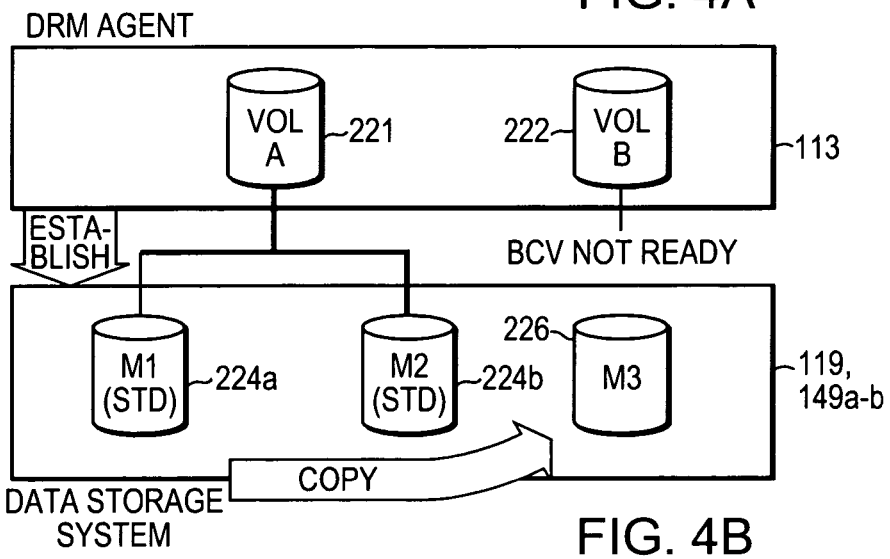
FIG. 4B is a representation of the configuration shown in FIG. 4A and demonstrating the effect of the ESTABLISH command on such a configuration in a preferred embodiment.
Figure 4C:
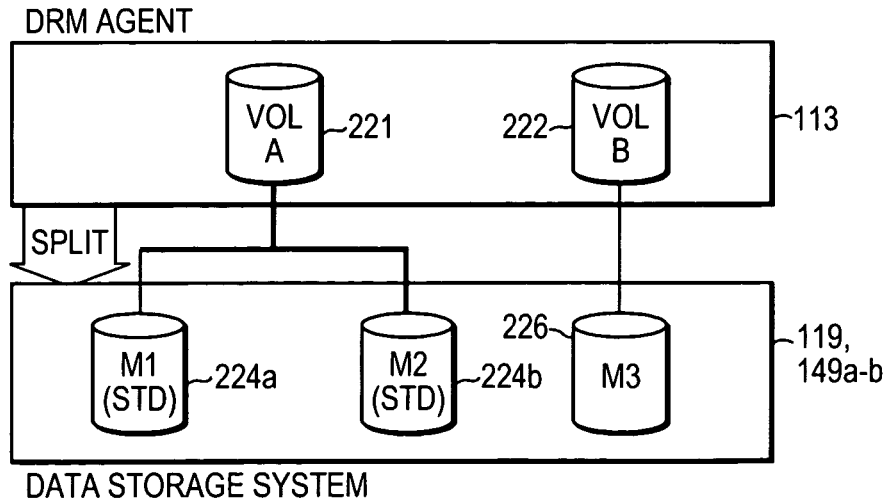
FIG. 4C is a representation of the configuration shown in each of FIGS. 4A and 4B demonstrating the effect of the SPLIT command on such a configuration in a preferred embodiment.

In FIG. 4A, a storage unit 119, or 149a–b (preferably an EMC Symmetrix) is represented as comprising two disk volumes that are mirrors, denoted as M1 and M2 respectively. They are an M1 volume 224a and an M2 volume 224b. Following this example configuration, a third storage volume 226 comprises a BCV device 226. In this particular example, the M1 and M2 devices 224 and 225 can actually comprise multiple physical disks as might be incorporated in a RAID-5 redundancy. In such an event the BCV volume would also comprise multiple disks so that the BCV device could act as a mirror. Generally each mirror volume and the BCV device will be on physical disk drives that connect to separate device or disk adapters, as known in the art.

Figure 4D:
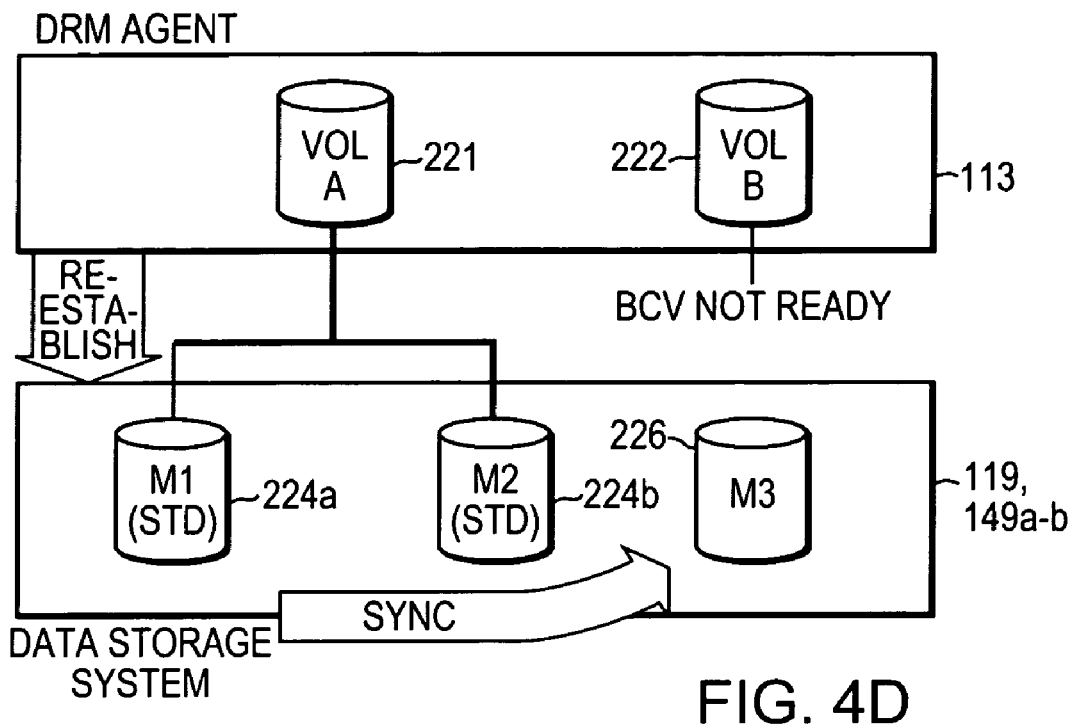
FIG. 4D is a representation of the configuration shown in each of FIGS. 4A–4C and demonstrating the effect of the RE-ESTABLISH command on such a configuration in a preferred embodiment.
Figure 4E:
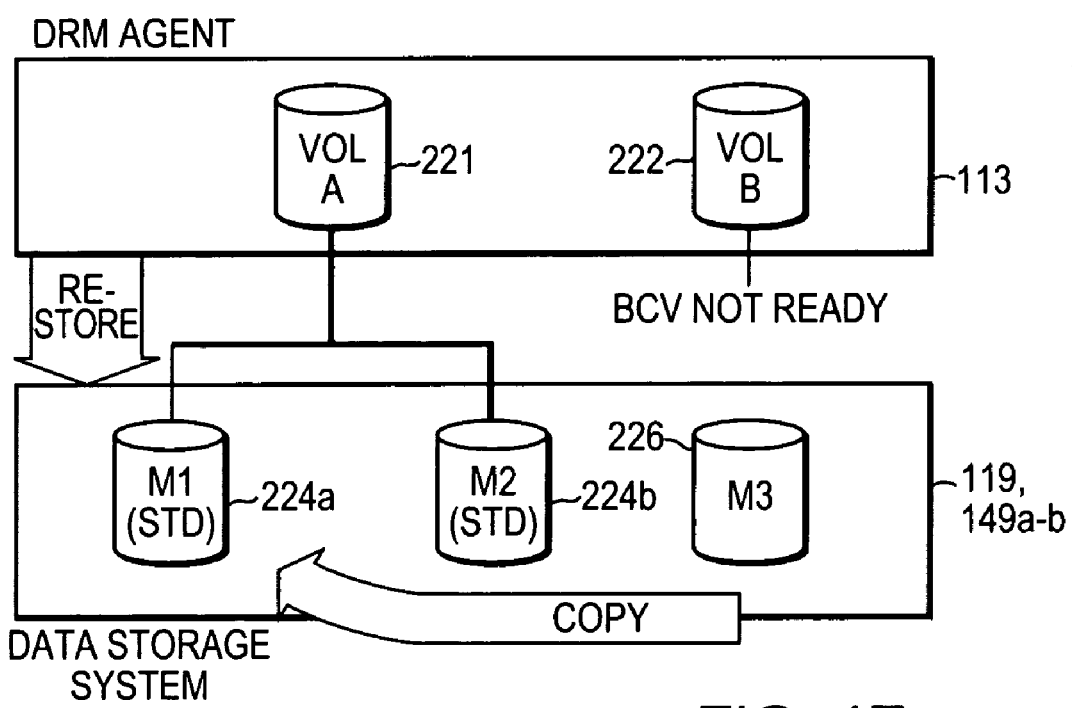
FIG. 4E is a representation of the configuration shown in each of FIGS. 4A–4C and demonstrating the effect of the RESTORE command on such a configuration in a preferred embodiment.

Once the shown relationship is established, the Agent 113 can issue a number of commands to ESTABLISH the BCV device 226 as another mirror (FIG. 4B), to SPLIT the BCV device 226 as a mirror and re-establish a data transfer path with the volume 222, (FIGS. 4C–4D) to RE-ESTABLISH the BCV device as a mirror 226 and to restore data from the BCV device 226 when it operates as a mirror synchronized to the storage devices 224a and 224b (FIG. 4E). Each of these operations is described in detail in the incorporated '497 reference, but are briefly explained now for the sake of completeness.

In the example configuration, the ESTABLISH command pairs BCV device 226 to standard device 224a M1 as the next available mirror M3. Then all tracks (full volume) are copied from the standard device M1 to the BCV device. On issuance of the SPLIT command following the ESTABLISH command, the established standard/BCV pair (224/226) are broken apart and the BCV 224 becomes available to its original host address.

Shown in FIG. 4D, a RE-ESTABLISH command is issued by Agent 113 to resynchronize the previously SPLIT standard/BCV pair by performing effectively an incremental ESTABLISH. Under operation of this command only updated tracks from the standard to the BCV device are copied and any BCV tracks that were changed are refreshed. The BCV device is not available to its original host address until SPLIT again. In a normal environment, once the volumes are ESTABLISHED, normal operation consists of a series of sequential RE-ESTABLISH and SPLIT commands according to some predetermined schedule, which is often dictated by backup needs.

FIG. 4E illustrates an analogous situation wherein devices on the Remote Systems 111a–b (FIG. 1) are used for copying devices on the Local Systems 100. If an error or fault condition occurs on Data Storage System 119 it may become necessary to recover data from all such storage devices using data mirrored over to storage devices on remote data storage system 149a or 149b. Employing the preferred EMC Symmetrix data storage system such a recovery operation is known as a "failover" using a Symmetrix Data Remote Facility (SRDF) system. Generally, a failover involves restoring data damaged, corrupted, or lost on a local (primary or source) data storage system with data that has been mirrored to a remote (secondary or target) data storage system. The SRDF is a facility for maintaining real-time or near-real-time physically separate copies of selected volumes, and is available from EMC of Hopkinton, Mass. Although the SRDF system is the preferred embodiment of a remote data storage system, one skilled in the art will recognize that any embodiment of a remote data storage system can be used within the scope of the claimed invention.

Figure 5:
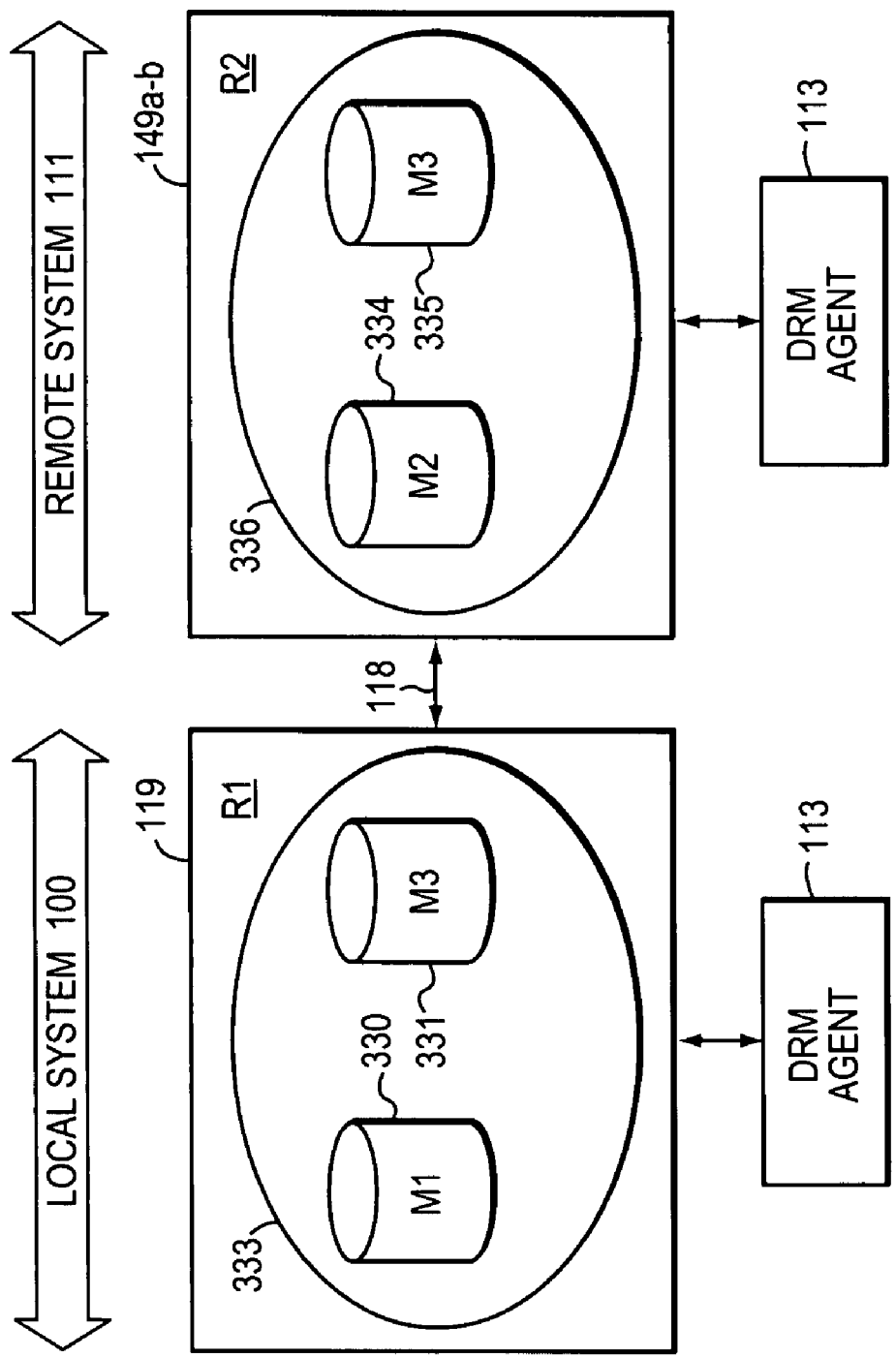
FIG. 5 shows the effect of at least some of the various commands shown in FIGS. 4A–4E within the depicted local and remote data storage environments of FIG. 1.

For the sake of completeness, an example of such a configuration is now given with reference to FIG. 5. For the sake of completeness, an example of such a configuration is now given. An Agent 113 on Local System 100 and Remote System 111a each interact with each respective Data Storage System as described with reference to FIGS. 1–3 discussed above. The local system 100 includes two mirror memory devices identified as M1 and M3 mirror device 330 and 331. The M1 and M3 mirror devices represent a source device R1 designated by reference numeral 333.

At the Remote System, a data storage facility includes M2 and M3 mirror devices 334 and 335 that could attach to disk adapters such as disk adapters 146 and 147 in FIG. 1. These memory devices constitute a target or R2 memory device represented by reference numeral 336 that acts as a remote mirror of source device R1. As will be apparent, in this configuration there are local and remote mirrors. Each mirror has an assigned specific number, e.g., 1, 2, 3. Local and remote mirrors are designated by the use of "M" and "R" respectively.

Figure 6:
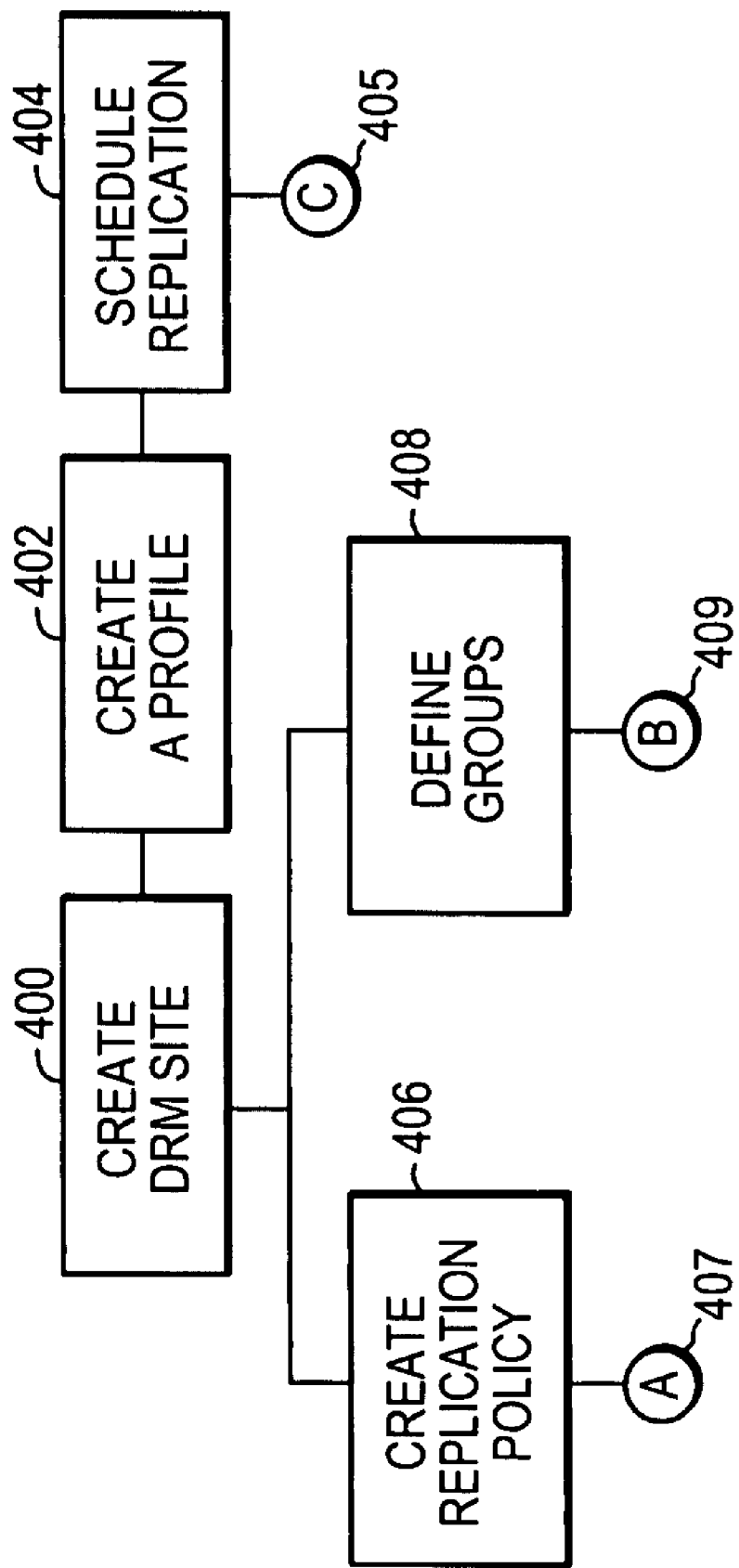
FIG. 6 is a flow logic diagram illustrating an overview of method steps of the method of this invention carried out by the logic of this invention.

General Overview of Method Steps for Managing Devices and Data Associated with Local and Remote Replication The Data Replication Manager system enables easy setup, management, and running of a replication process by an innovative system. Rules governing such a process (replication policy) may be flexibly set up by a user or administrator to govern the replication. FIG. 6 details the steps required to set up, manage, and run a replication process.

Referring to FIG. 6, in step 400 a user or administrator creates a so-called site, which includes the underlying steps of creating a replication policy (step 406) and defining groups (step 408). Creating a site is discussed further below with reference to using invention, because it is helpful to understand policies and groups thoroughly in order to fully understand sites.

Replication policy creation and group definition are each respectively described in detail with reference to FIGS. 7–8 below. Replication scheduling (step 404) follows site and profile creation (step 402) and is described in detail with reference to FIG. 9 below. Profile creation is also discussed further with reference to using the invention. Connector steps labeled A, B, and C (steps 407, 409, and 405, respectively) introduce FIGS. 7–9.

Figure 7:
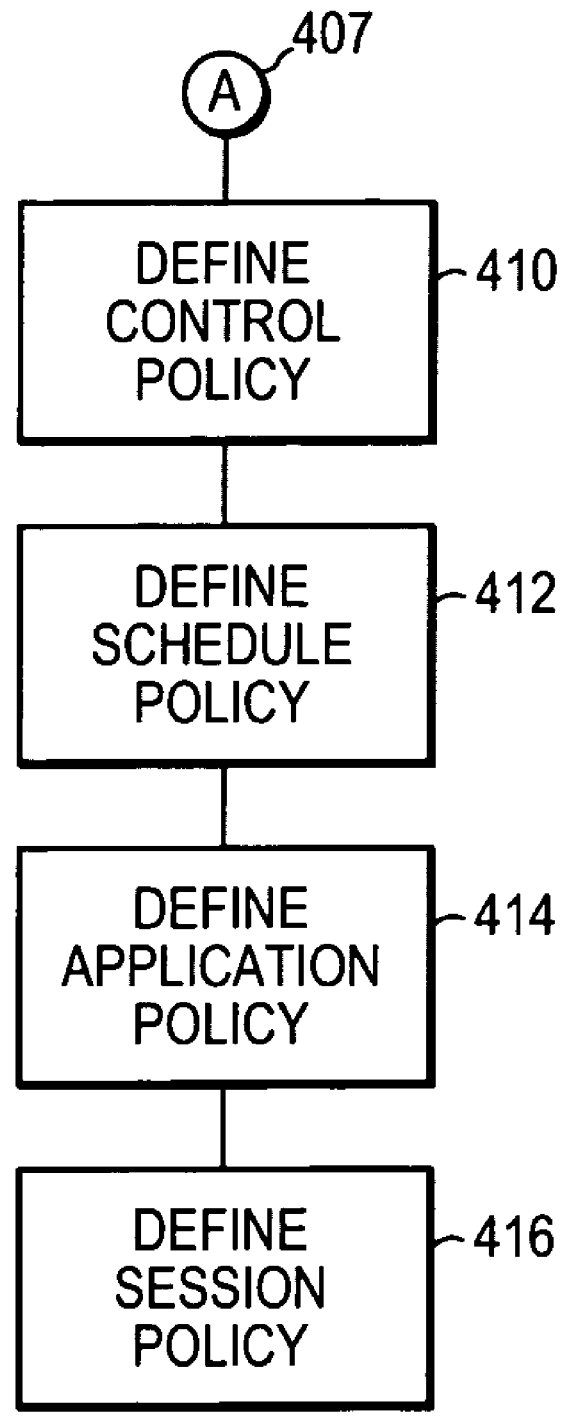
FIG. 7 is another flow logic diagram illustrating more method steps of the method of this invention carried out by the logic of this invention.

Referring to FIG. 7, following continuation step 407, the user or administrator using this invention is enabled to define control policy (step 410), define schedule policy (step 412), define application policy (step 414), and define session policy (step 416).

Figure 8:
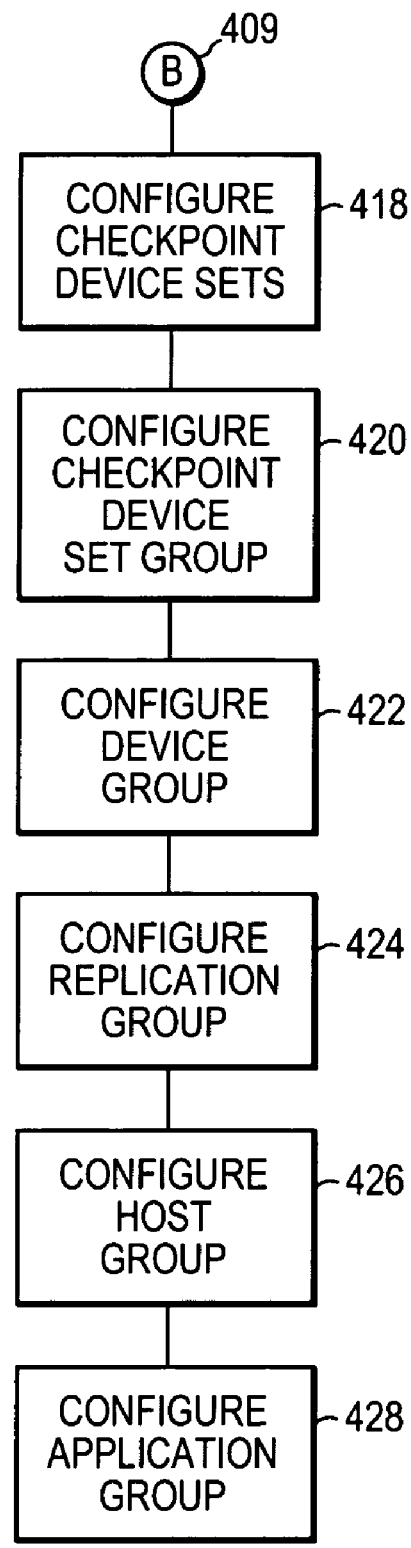
FIG. 8 is another flow logic diagram illustrating more method steps of the method of this invention carried out by the logic of this invention.

Referring to FIG. 8, following continuation step 409, the user or administrator using this invention is enabled to configure checkpoint device sets (step 418), configure a checkpoint device set group (step 420), configure a device group (step 422), configure a replication group (step 424), configure a host group (step 426), and configure an application group (step 428).

Figure 9:
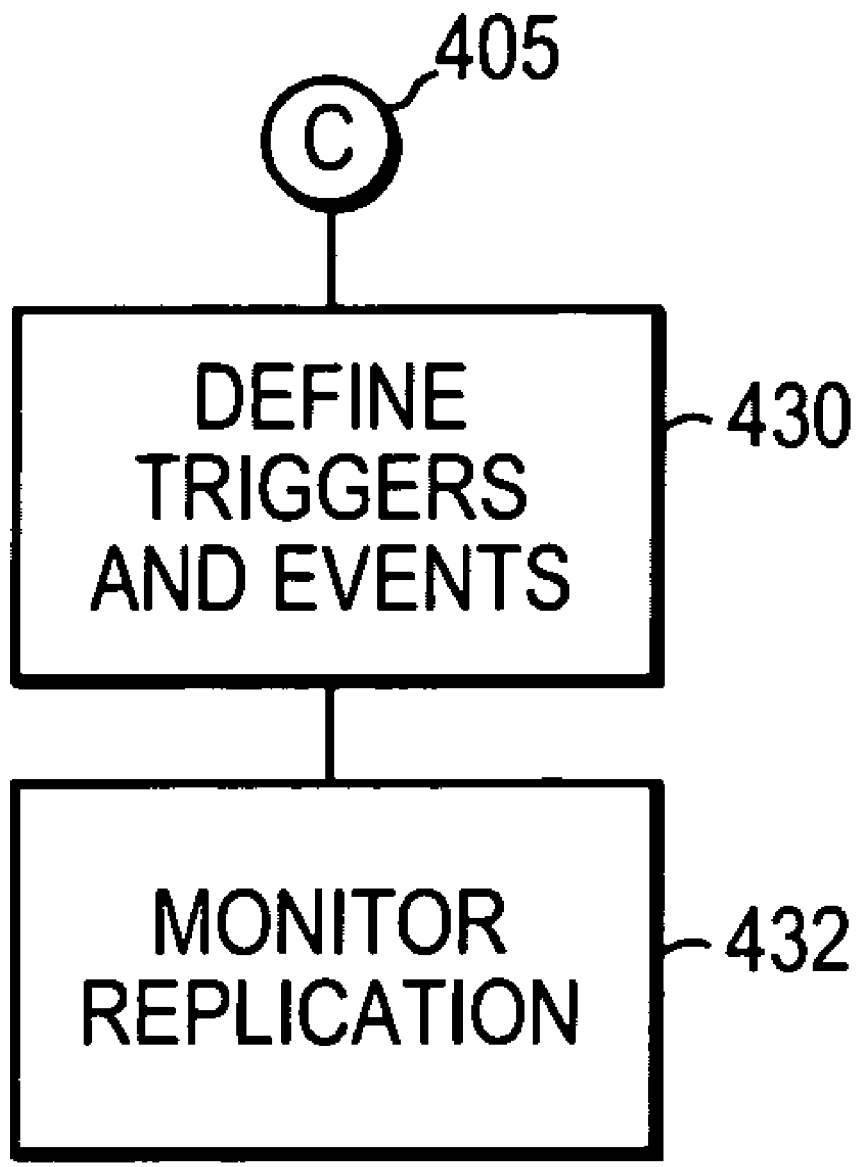
FIG. 9 is another flow logic diagram illustrating more method steps of the method of this invention carried out by the logic of this invention.

Referring to FIG. 9, following continuation step 405, a user or administrator may use this invention to schedule a replication by defining trigger an advance (step 430), and set up the system for monitoring replication (step 432).

Groupings

Figure 10:
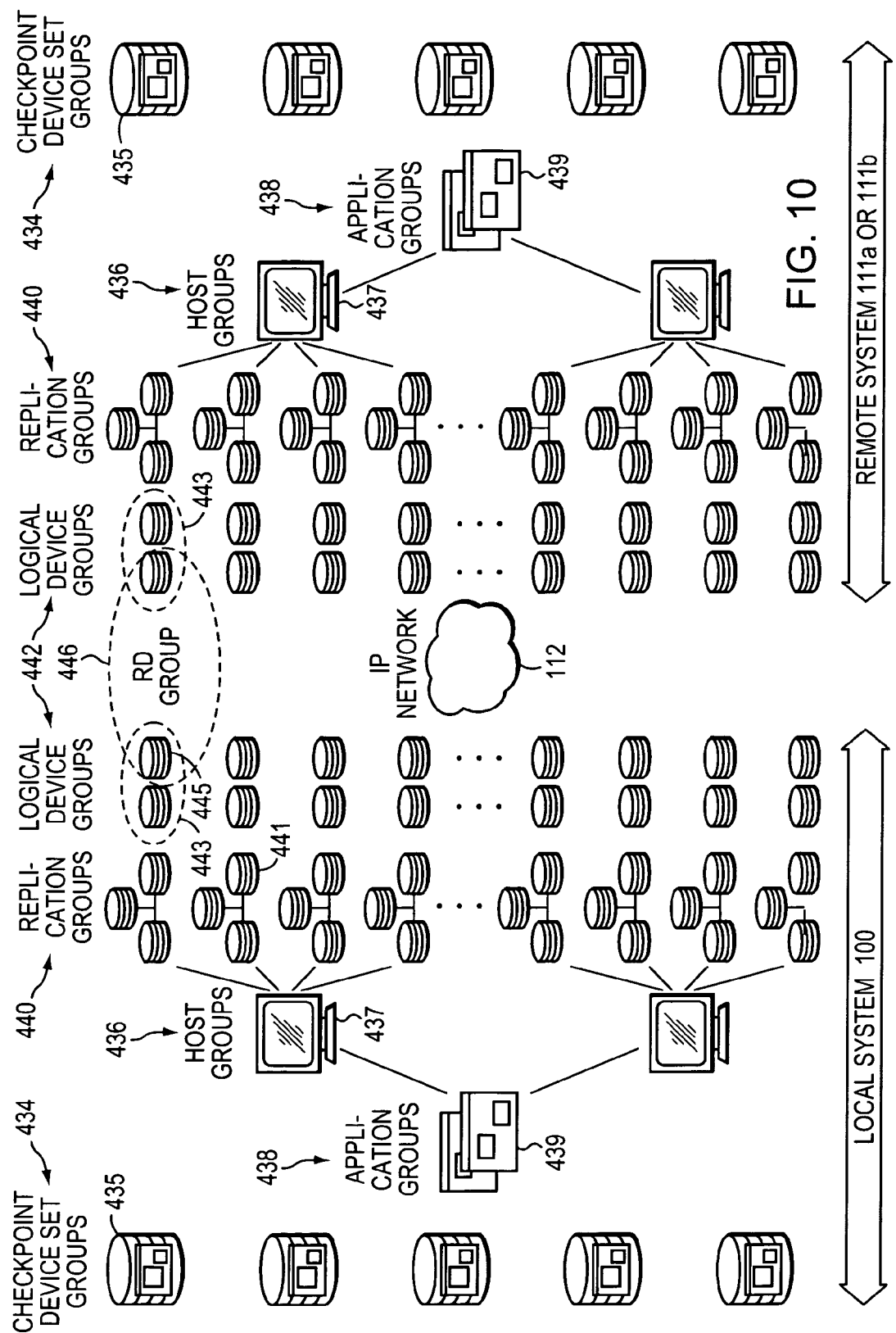
FIG. 10 is schematic showing logical grouping of logical devices included within the system shown in FIG. 1 and in accordance with carrying out the method steps shown in FIGS. 6–9.

Referring to FIG. 19, generally, a DRM group is a logical grouping of devices at different control levels. There can be multiple groups in any category and such groups are shown in FIG. 10 and described (from lowest to highest level) below. A Logical Device Group 442 (hereafter simply "Device Group;" FIG. 10) is a grouping of logical devices, such as device group 443 including devices 445 for replication. For example a Device Group can consist of a STD device and a BCV device. Other Device Groups might consist of a STD device and a BCV/R1 device, a BCV/R1 device and an R2 device, or a STD device and two BCV devices.

A Replication Group 440 is a grouping of the Logical Device Groups 442 involved in a replication operation from the beginning to the end of the replication path. One Replication Group is required for each STD device in a replication. A Replication Group can contain one Device Group, such as Device Group 441, in the case of mirroring functions taking place on a single Data Storage System, or may contain many, as in the case of remote mirroring (FIG. 5). And may include multiple mirroring functions across multiple remote systems.

A Replication Group consists of one or more Device Groups and defines the device path that a replication moves along until it reaches the desired location. Generally, it is a good choice to have one Replication Group for each replicated STD device or R1 device. If using replication locally and remotely, it is preferred to use a minimum of two or more Device Groups for each Replication Group.

Replication Groups may be further managed by allocating Replication Group Types. A good choice for allocating Replication Group types are listed below:

1. STD-BCV:

Generally this is local replication requiring only one Device Group. They are used for Synchronize actions, for example a Device Group containing one STD device to one BCV device and the location is local. They are also used for CheckPoint actions, for example where a Device Group containing one STD device and the location is local. They are also used for Synchronize actions with the feature of Concurrent BCV devices, for example, as a Device Group containing one STD device to two BCV devices and the location is local.

2. STD-BCV/R1–R2-BCV

Generally this is local, remote, and again local replication requiring three or more Device Groups. Such replication group types are useful for Synchronize actions. For example, if a first Device Group contains one STD device replicated to one BCV/R1 device and location is local, and a second Device Group contains one BCV/R1 device replicated to one R2 device and location is intermediate, and a third Device Group contains one R2 device to one BCV device and location is remote.

3. R1–R2-BCV

Generally this is local and remote replication requiring two Device Groups. Such replication group types are useful for Synchronize actions. For example, if a first Device Group contains one R1 device and one R2 device but the replication occurs locally, and a second Device Group contains one R2 device and one BCV device and location for replication is set to remote.

In summary, in the preferred embodiment, a Device Group is a pairing or grouping of devices that are synchronized and split together. There are two types of Device Groups: BCV Groups and RD Groups. A BCV Device Group consists of at least one STD device and at least one BCV device (including for example a remotely located device such as BCV/R1). An RD Device Group can consist of any of the following: One R1 device and one R2 device and one BCV/R1 device and one R2 device.

Figure 11:
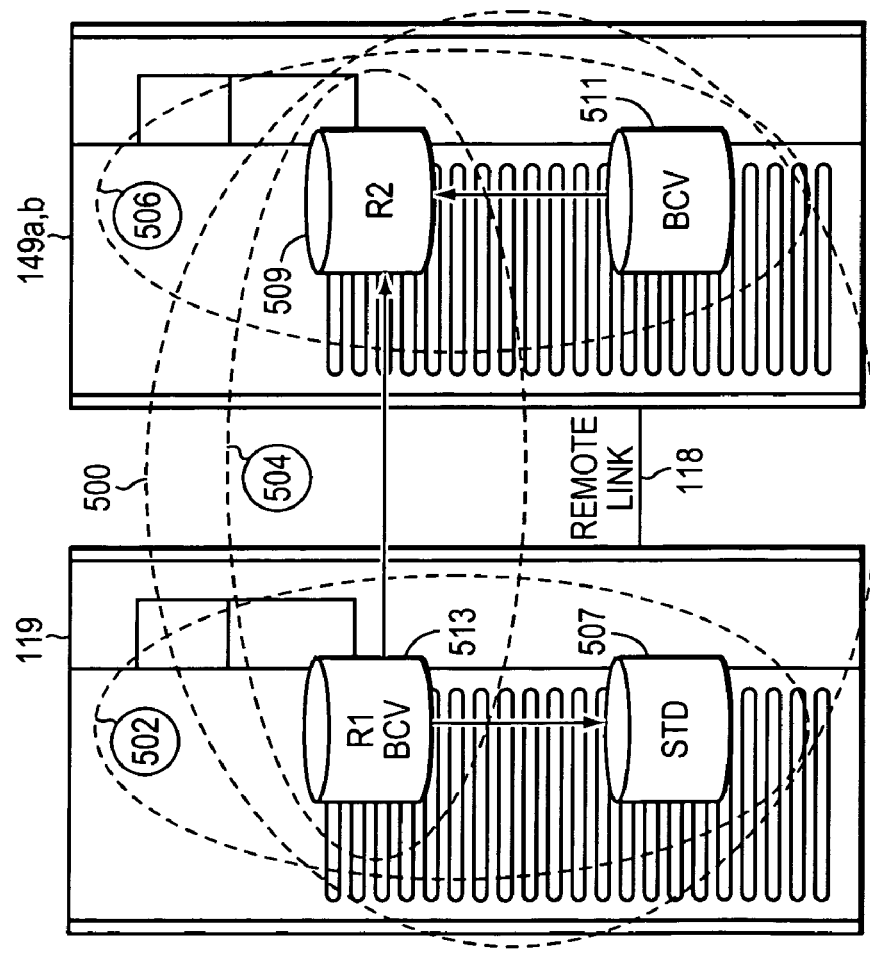
FIG. 11 shows an example of logical grouping of a replication group created from the plurality of logical device groups shown in FIG. 10 and in accordance with the method steps shown in FIGS. 6–9.

FIG. 11 shows three Device Groups 502, 504, and 506 in one Replication Group 500 establishing a replication path from a STD device 507 to a remote BCV 511 spanning Data Storage System 119 to Data Storage System 149a or 149b across remote link 118. The first Device Group 502 comprises the STD device 507 and a BCV/R1 device 513, the second Device Group 504 comprises the BCV/R1 device 513 and an R2 device 509, and the third Device Group 506 comprises the R2 device 509 and a BCV device 511. Data flow arrows show one direction of data flow for example between devices, but one skilled in the art will recognize that data may flow in any direction in and among the Data Storage systems.

Referring again to FIG. 10, Host Group 436 (centering on a Host, such as Host Computer 437) is a grouping of Replication Groups 440 to control a specific Group of devices together. A Host Group contains one or more Replication Groups. One may associate Replication Groups with a Host Group to control all of the devices in the Replication Groups together. This grouping level is for replicating applications. For example, by putting different sets of devices into different Host Groups one can give them different Replication Policies, such as different schedules.

Another level of group granularity associated with Host Grouping is denoted as Consistency Groups. Consistency Groups may be enabled at the Host Group level for devices within the linked Host Group. For example, one might choose to enable Consistency Groups if the devices within the Host Group are located on different remote links (e.g., EMC SRDF links).

Another level of group granularity associated with Host Grouping is denoted as Application Groups. An Application Group contains one or more Host Groups. It is preferred to associate Host Groups with an Application Group when it is desirable to control all of the devices contained within the Host Groups together. For example, one might choose to create an Application Group to start an application on the remote side.

Application Group 438 is a grouping of Host Groups 436 to control a specific Group of devices together if all are associated with an application to be replicated such as application 439, which may for example be a database (e.g., an Oracle database). Remote Device (RD) Group 446 groups one or more logical devices 445 in logical device groups 443 that are distributed across local system 100 and remote system 111a or 111b across IP network 112. At the Application Group level, one can enable Consistency Groups using this invention. One may enable consistency groups at the Application Group level for devices contained within that Application Group. For example, you might choose to enable Consistency Groups if the devices within different Host Groups resides on different SRDF links. If any of the remote links, such as SRDF links are out of service then devices within the Application group marked as belonging to a consistent group remain consistent.

Referring again to FIG. 10, CheckPoint Device Set Group 434 is a set of BCV devices used for a point-in-time copy of a Group of devices. For example, if an application resides on four STD devices, four BCV devices of the same logical size will be needed in each of the CheckPoint Device Sets. It is a good choice to have as many CheckPoint Device Sets as the number of point-in-time copies desire for maintenance.

In summary, DRM, in a preferred embodiment allows configuring replications by using the following grouping levels: Device Group—A pairing or group of Symmetrix devices; Replication Group—A group of Device Groups; Host Group—A group of Replication Groups; Application Group—A group of Host Groups; CheckPoint Device Set—A group of BCV devices on either the local or remote side; and CheckPoint device Set Groups—A group of CheckPoint Device Sets.

Now that important concepts and terminology have been described, a more detailed description of a Replication Policy now follows. A Replication Policy controls how the replication is accomplished. The following Policy areas can be assigned to a Replication Policy: Control Policy; Schedule Policy; Application Policy; and Session Policy. A Replication Policy can be associated with any Group level (Device Group, Replication Group, Host group, etc.). All replications must have, as a minimum requirement, a Control Policy (determines the replication behavior) and a Session Policy (defines the duration of the session) in the Replication Policy associated with the highest Group level. If a replication does not have a Session Policy associated at the highest Group level, the replication will start but will only have a predetermined time such as one hour to complete. If the replication does not complete in one hour, it will timeout and abort. If a Control Policy is not associated at the highest grouping level, the DRM Server does not know what to do with the replication, and does not start. This is true for either Synchronization or CheckPoint replication configurations. Session Policy areas associated with lower level groups override Session Policy areas associated with higher level group policies.

The Control Policy determines the behavior of the replication process. The Control Policy also defines how the replication occurs and the order in which replication operations are performed. A Control Policy can be assigned to any grouping level, and multiple Control Policies may exist within one replication.

The following options may be set to create a Control Policy: Replication Mode; Command Mode; Rendezvous Mode; Policy Mode; Priority Mode; and Local Split Mode.

There are two Replication mode options to choose from: Complete—all the tracks of the device(s) must be synchronized; and Incremental—only the changed tracks of the device(s) are synchronized. An incremental replication usually takes a shorter amount of time than a complete replication. There is, however, an exception to this rule. If changes occurred on every track on the device, a complete synchronization takes place even if the replication mode is set to incremental.

There are two command mode options to choose from: Synchronize—replicates a device or set of devices from the source to the target each time the replication occurs; and CheckPoint—maintains multiple point-in-time copies of a device or a set of devices. The Synchronize mode replicates a device or a set of devices from the source to the target. For example, if the Synchronize mode is used to replicate a STD device to a BCV/R1 device to an R2 device to a BCV device, the same process (to the same BCV device) will take place each time the replication is scheduled. It is also possible to synchronize to a different device each time with the Synchronize mode. For example, one might need to synchronize a STD device to a BCV/R1 device to an R2 device to one or another BCV devices.

Figure 12:
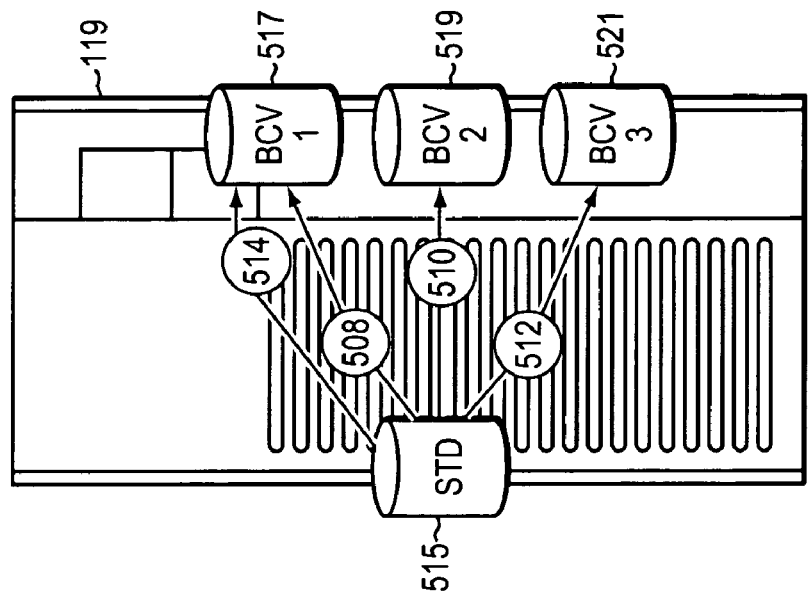
FIG. 12 shows an example of logical grouping of a checkpoint device group created from the plurality of logical device groups as shown in FIG. 10 and in accordance with the method steps shown in FIGS. 6–9.

FIG. 12 shows an example of an implementation of a Checkpoint Device Set Group on Data Storage System 119, but it could of course be the other Data Storage Systems shown. A CheckPoint Device Set is a BCV device or a group of BCV devices configured to store a point-in-time copy of a STD device(s) or R1 device(s). These BCV devices may be located on the local or remote side but each CheckPoint Device Set must contain either all local or all remote BCV devices. A CheckPoint Device Set is one point-in-time copy. In each CheckPoint Device Set you need as many BCV devices as the number of STD devices or R1 devices being copied.

The example CheckPoint configuration shown in FIG. 12 maintains multiple point-in-time copies of a device or a set of devices. These point-in-time copies may be all stored on local BCV devices, on remote BCV devices, or on a mixture of local and remote BCV devices. In the example shown in FIG. 12, three point-in-time copies are needed. The first time the replication takes place, the STD device 515 establishes to device 517 denoted as BCV_1 as indicated by data flow arrow 508. The second time the scheduled replication takes place, the STD device establishes to device 519 denoted as BCV_2 and the replication is indicated by data flow arrow 510. The third time the replication occurs, the STD device establishes to device 521 denoted as BCV_3 and the replication is indicated by data flow arrow 512. The next time the replication occurs, the STD devices establishes to BCV_1 again and the replication is indicated by data flow arrow 514. The process continues in this fashion each time the replication is scheduled to run.

A CheckPoint Device Set Group contains one or more CheckPoint Device Sets. The CheckPoint Device Set Group is the Group that gets associated with either a Device, Replication, Host, or Application Group. CheckPoint Device Set Groups are preferably associated at the highest Group level for a replication. The CheckPoint Device Set Group can contain all local devices, all remote devices, or a mixture of local and remote devices. For example, if an application resides on 10 STD devices and four point-in-time copies are needed, then four different CheckPoint Device Sets must be created, each containing 10 BCV devices. All four CheckPoint Device Sets can then be associated with one CheckPoint Device Set Group, which is then in turn associated with a Host Group or an Application Group.

If associating a CheckPoint Device Set Group with a Device, Replication, Host, or Application Group, the following list details the supported replication types and describes how to set up the Device Groups for the Replication Groups:

1. STD-BCV—When configuring a CheckPoint Device Set for this replication type, the minimum requirements are: create one or more CheckPoint Device Sets that each contain one BCV device (CheckPoint Device Sets must be local); associate the CheckPoint Device Sets with one CheckPoint Device Set Group; create a Device Group containing a STD device with a location of local; and associate the CheckPoint Device Set Group to the Device Group.

2. STD-BCV/R1–R2—When configuring a CheckPoint for this replication type, the minimum requirements are: create one or more CheckPoint Device Sets that each contain one BCV device (a CheckPoint Device Set can be either local or remote); associate the CheckPoint Device Sets with one CheckPoint Device Set Group; create a Device Group containing one STD device and one BCV/R1 device with a location of local; create a Device Group containing one BCV/R1 device and one R2 device with a location of intermediate; • Create a Device Group containing one R2 device with a location of remote; associate all three Device Groups into one Replication Group; and associate the CheckPoint Device Set Group to the Replication Group.

3. R1–R2-BCV—When configuring a CheckPoint for this replication type, the minimum requirements are: create one or more CheckPoint Device Sets that each contain one BCV device (these BCV devices must be remote); associate the CheckPoint Device Sets with one CheckPoint Device Set Group; create a Device Group containing one R1 device and one R2 device with a location of local; create a Device Group containing one R2 device with a location of remote; associate both Device Groups into one Replication Group; and associate the CheckPoint Device Set Group to the Replication Group.

Checkpoint replication is useful also with regard to performing a restore with DRM. In such a case, one may restore from a BCV device to a STD device, but only from a CheckPoint replication. In a preferred embodiment, by default, DRM restores to the STD device last paired with the BCV device. The invention provides flexibility through the GUI for the user or administrator to choose to restore to a different set of STD devices residing on the same Symmetrix system.

Figure 13:
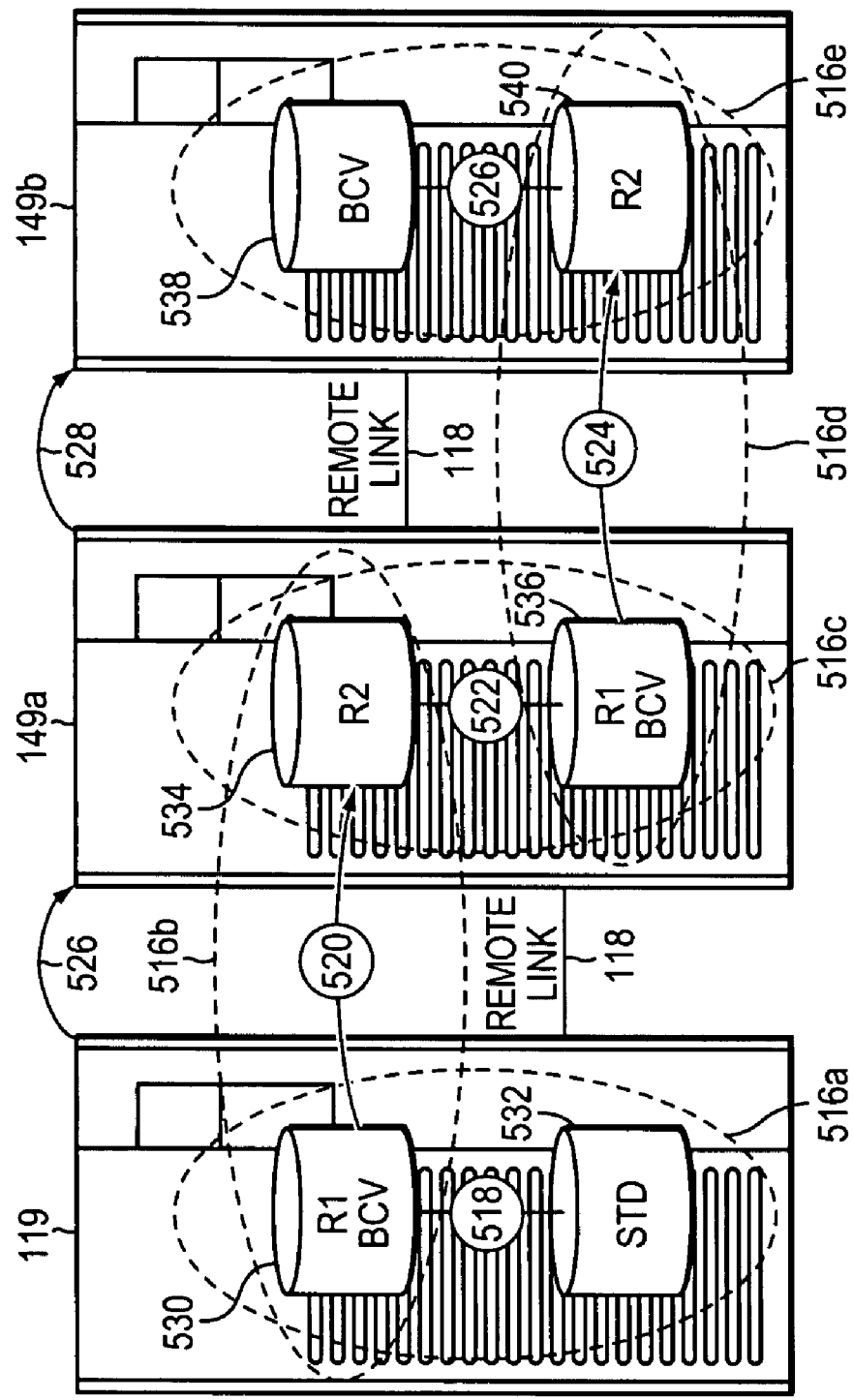
FIG. 13 shows an example of intermediate device groups created from the plurality of logical device groups as shown in FIG. 10 and in accordance with the method steps shown in FIGS. 6–9.

FIG. 13 shows a multiple mirroring or replication example, wherein replication of mirrored data uses multiple Device Groups 516a–e and occurs from a local data storage system 119 and over more than one remote system 149a and 149b referred to by EMC as multi-hops, e.g. so called hop 526 and hop 528. In this example, the multiple mirroring or replication is managed by using the Device Groups 516a–e, respectively: (1) STD 532 to BCV/R1 530 across data flow path 518—Local Device Group 516a; (2) BCV/R1 530 to R2 534 across data flow path 520—Intermediate Device Group 516b; (3) R2 534 to BCV/R1 536 across data flow path 522—Intermediate Device Group 516c; (4) BCV/R1 536 to R2 across data flow path 524—Intermediate Device Group 516d; and (5) R2 540 to BCV 538 across data flow path 526—Remote Device Group 516e.

Policies in View of Groupings

Returning once again to a general explanation of policies and their relationship with Device Groups, a Rendezvous mode controls when the actions of devices in a group occur. In Rendezvous mode, all devices in a group must reach the same state before any devices in the group can move to the next state. There are four choices for Rendezvous mode: Local—all devices on the local side must reach the same state before moving to the next state; Remote—all devices on the remote side must reach the same state before moving to the next state; All—all devices on the local and remote side must reach the same state before moving to the next state; and None—all devices can move to the next state on their own.

For example, a Host Group that has a Replication Policy containing an associated Control Policy with the Rendezvous mode set to local means that all devices on the local side in that Host Group are affected by that Replication and Control Policy. Devices on the local side (such as with local system 100) can be a STD device to a BCV device or a STD device to a BCV/R1 device (See FIG. 11 for example). If the Rendezvous mode is set to remote, only the action on the remote side is affected. This means that the Replication and Control Policy affect all devices on the remote side of the SRDF link. In this example, devices on the remote side are an R2 device to a BCV device. If the Rendezvous mode is set to all, then all devices on both the local and remote side are affected by the Replication and Control Policy. If Rendezvous mode is set to none means that devices can move to each state without having to wait for other devices. Of course one skilled in the art will recognize that the choice of an identifying name for each of the modes, e.g. "all" or "none" is simply a choice but that the operations of the modes are part of the fabric of the novelty and usefulness of the invention, and this underlying principle applies globally to this invention.

The invention conveniently provides three choices for Policy mode in a preferred embodiment: (1) Automatic—replication runs automatically; (2) Manual—user intervention is required to start the replication; and (3) Event—the replication waits for an event to occur before the replication begins.

Setting the Policy mode to automatic means that the associated group starts automatically. A Replication Policy containing a Control Policy with the Policy mode set to automatic also needs a Schedule Policy if the Replication Policy is associated at the highest grouping level. Groups at a lower level with than the associated group also start automatically in appropriate sequence. In the preferred embodiment, Setting the Policy mode to manual means that the associated group requires a user to start the replication. It is a good choice not to set lower level groups at manual or user intervention shall be required for each. Setting the Policy mode to event means that the associated group is waiting for an event to occur before it begins its replication. This event can be internal or external to the DRM Server.

For example, there may be two databases named DB1 and DB2, and replication of DB2 should not occur until DB1's replication is complete. To accomplish this, in accordance with the invention a user may create a Replication Policy containing a Control Policy with the Policy mode set to event for DB2. Associating the Replication Policy at the highest group level, DB1 causes DB2's replication to not start until it receives an event from the DB1 replication.

An external event may also trigger the replication for a group to begin. The Policy mode at the highest group level must be set to event. An example of an external event is a scheduler, which may trigger an event based on date/time.

Priority Levels may be set with the invention to allow setting which replications take precedence over others. A replication with a higher priority does not allow a lower priority replication to begin until it finishes, e.g. 0— lowest priority to 6—highest priority. For example, if a replication is running that has a priority set to 0, and another replication starts with the priority of 1, both replications continue to run. If a replication is running that has a priority of 1, and another replication is scheduled to start with a priority of 0, the replication with a priority of 0 will not start until the replication with priority 1 completes.

A suggested exception to this rule should be when a user needs to execute a replication manually such as a restore. These types of replications should receive the highest priority. When these types of replications start, all replications currently running are allowed to complete, but no replication with a lower priority can begin until the manual or restore replication completes. Any replication that needs to be triggered manually, such as a restore, is usually of high importance and requires all of the resources to complete the replication in the fastest amount of time.

In the preferred embodiment, the invention has certain modes including Local Split mode allows a user to control whether the DRM Server automatically splits local devices (FIGS. 4A–4E) or skips the split of local devices. Local devices can be a STD device to a BCV device or a STD device to BCV/R1 device. The local split mode has two options: Split and Skip. If the user chooses the Split option, the DRM Server to automatically do the split of devices on the local side. An example of when a user might choose the Skip option is when the system is performing a script that automatically splits devices on the local side.

In the preferred embodiment, the Application Policy allows the user to define scripts to run at specific times during the replication to control your applications and/or any other processes. These scripts are user-defined. Preferably such a script should be set to run at a specific time during the replication, and include the following information type of identifying information: (1) Name—A name for the action; (2) Location—There are two options: (a) Local—The script executes on the local host of the replication; and (b) Remote—The script executes on the remote host of the replication; (3) Host or computer name—The host or computer name or IP address of the host on which the scripts reside; (4) Event—The point at which the script is executed during the replication, e.g. before a STD device is established to a BCV device or to a BCV/R1 device on the local side or an R2 device is established to a BCV device on the remote side, or before a STD device is split from a BCV device or a BCV/R1 device on the local side.

It is a good practice to include exit codes when writing scripts to use with DRM. DRM recognizes an exit code of zero as success, and any other number greater than zero as unsuccessful. If the DRM Server receives an exit code greater than zero it reports an error and aborts the replication. As good practice, the user or administrator should have a separate log file for scripts so that you can determine the cause of the error. Examples of scripts for Oracle Database may be obtained from EMC Corporation of Hopkinton, Mass. for the preferred embodiment using a EMC Symmetrix Data Storage System.

The Session Policy determines the length of time a replication is allotted to complete. The length of time should be entered in seconds. A Session Policy may be assigned to any group level, and you can have many Session Policies in one replication depending on your business requirements. A Session Policy should be associated with the highest Group level and in a preferred embodiment the DRM Server defaults the total amount of time for the replication to one hour (3600 seconds). If the replication is not complete in that amount of time, the replication times-out and is aborted.

The frequency of a replication is defined using the Schedule Policy tool of this invention. Scheduling of a replication is done either within the DRM Server or externally. Preferably, the modes and their options for the Schedule Policy are as follows: Parameters include Monthly; Week or Date— Select the week, multiple weeks in a month, or a single day; Day—Select one day of the week, or multiple days; Time— The time of day that the replication will run. For Example: Run the replication the first and third week of the month on Monday, Wednesday, and Friday at midnight. The invention preferably includes a range of time in which the user can exclude from replications occurring.

Useful practices for setting policies and now described. All replications need a Session Policy (that determines the length of time the replication is allotted to run) associated at the highest group level. If not, the replication session length defaults to one hour. A Control Policy can be used in conjunction with a Schedule Policy that is associated with the highest group level to set up a replication to run automatically at a specific time. A Control Policy can be used in conjunction with a Schedule Policy that is associated with the highest group level to set up a replication to run automatically in response to an external triggering, such as an external event. A Control Policy can also be used in conjunction with a Schedule Policy that is associated with the highest group level of another group associated with an internal event to run automatically in response to an internal triggering.

Preferably, the Application Policy should include a rule that executes either a program script to trigger an event for replication. If the highest group level has a Control Policy with the Policy mode set to automatic, all of the lower group level's Replication Policies containing Control Policies should have the Policy modes set to either Automatic or Event. If the highest group level has a Control Policy with the Policy mode set to Manual, all of the lower group level's Replication Policies containing Control Policies should have the Policy modes set to either Automatic or Event. If the highest group level contains a Control Policy with the Policy mode set to automatic, then no Replication Policies for any of the lower groups contain a Control Policy with the Policy mode set to manual.

To protect devices from being used by different applications at the same time, or anytime, device locking is implemented in SymmAPI 4.3 in the preferred embodiment. Device locking means that once a device is locked by an application, it is not available to other applications. SymmAPI is a particular application program interface available from EMC for interfacing with an EMC Symmetrix data storage system, such as Data Storage System 119.

Devices should be locked by the DRM application, running on the DRM Server and Agent. With SymmAPI, if a device is locked by another application, then replication cannot run. A device that was locked by DRM can be used in other replications configured by DRM, but not by other applications.

USING THE INVENTION

Referring again to FIG. 6, the first step in setting up a replication is to create a site. A site consist of Groups and Replication Policies. Replication Policies are a set of rules that can be applied to any device grouping. The DRM invention allows a user or administrator to setup a site for one replication or for multiple replications. If choosing to have one replication per site and advantage is that it is easier to troubleshoot versus multiple replications per site, and also easier to modify groups or policies for replication within the site. On the other hand, associating any device with a group removes it from being available for association with other groups but such devices remain available for grouping within a new site which is a dangerous practice because of inherent complexity and possible confusion.

An advantage for choosing to have multiple replications per site is that it as devices are used for each replication, they are not available for other replications which eliminates the complications and confusion described above. On the other hand, troubleshooting is more complex because of the multiple replications per site. Also before a user or administrator may use the GUI 115 (FIG. 1) to modify a group or policy for replication, all of the replications with the site must be removed from being scheduled for replication (the site itself may be copied and changes made to the copy but again much attention to detail is needed).

Figure 14A:
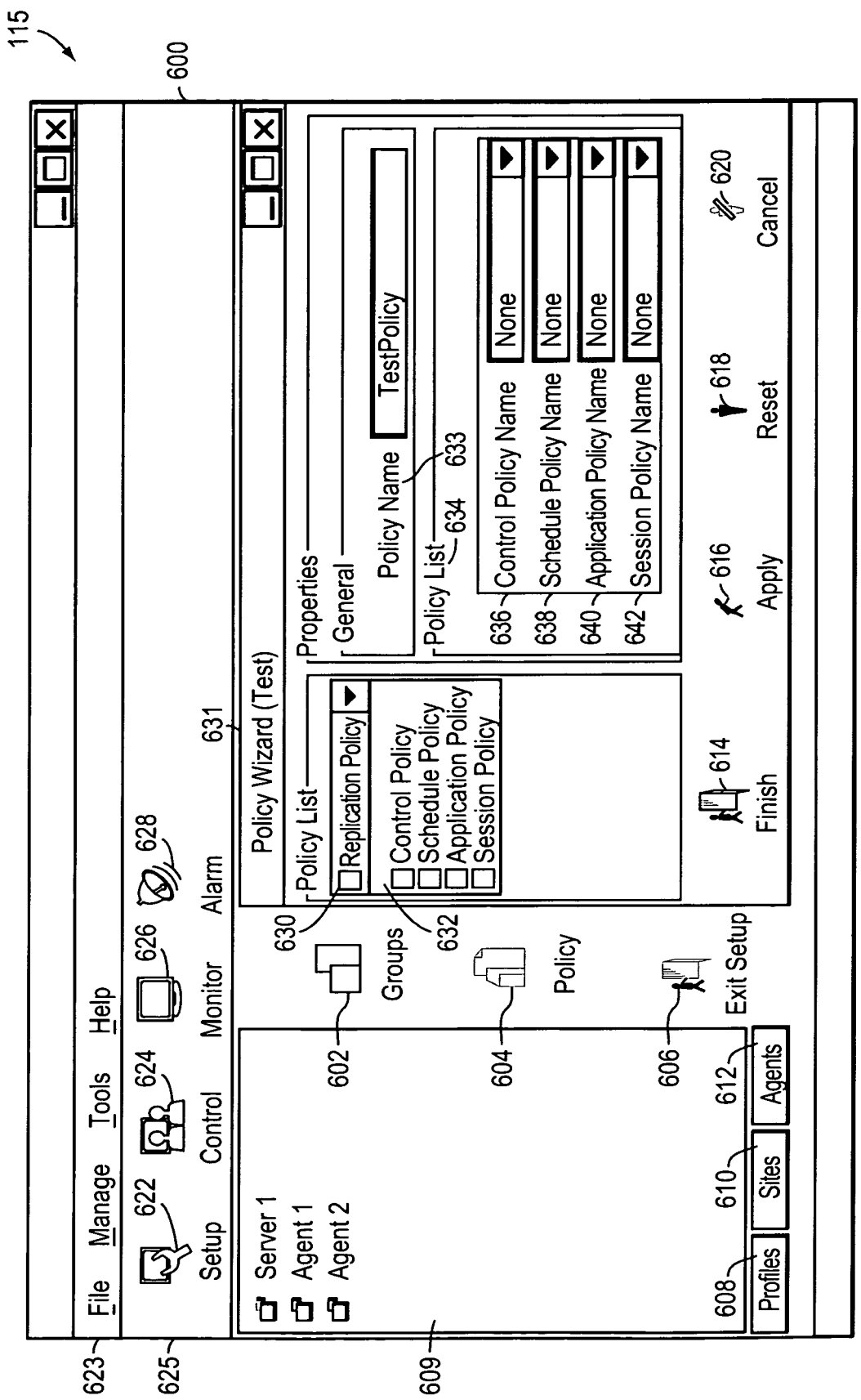
FIG. 14A shows an example of an arrangement of a GUI screen useful as a GUI of the system of FIG. 1 and for implementing the method steps of FIGS. 6–9.

FIG. 14A shows an example screen 600 for GUI 115 for the user or administrator to define policies and/or groups and may be used with a Wizard-type tool invoked at menu bar 631, wizards being generally known in the software arts, particularly for use in Microsoft Windows environments to help with configurations and installations. The GUI and software tools, e.g. a Wizard-type tool, which is an easy to use tool for guiding a user or administrator may be used for creating and defining Replication Policies.

Referring again to FIG. 14A, the preferred screen layout of screen 600 of the GUI 115 is discussed. A Policy List area 634, includes fields 636, 638, 640, and 642 for identifying, respectively, Control Policy Name, Schedule Policy Name, Application Policy Name, and Session Policy Name. Groups, a Policy, and Setup exit Icons 602, 604, and 606, respectively are used to allow definitions and access to these important aspects. A general menu bar 623 allows easy access to general items (File, Manage, Tools, and Help). The following Icons 622, 624, 626, and 628 are used for access to consoles for these functions: Control, Monitor, Setup, and Alarm, respectively. Icons 614, 616, 618, and 620 are used for implementing these respective functions: Finish, Apply, Reset, and Cancel.

Buttons 608 and 610 can be used to create Profiles and Sites. While button 612 is used to further manipulate and access Agent identifications and configurations. Agents and Servers for association with Policies created using GUI 115 are represented in screen area 609.

Figure 14B:
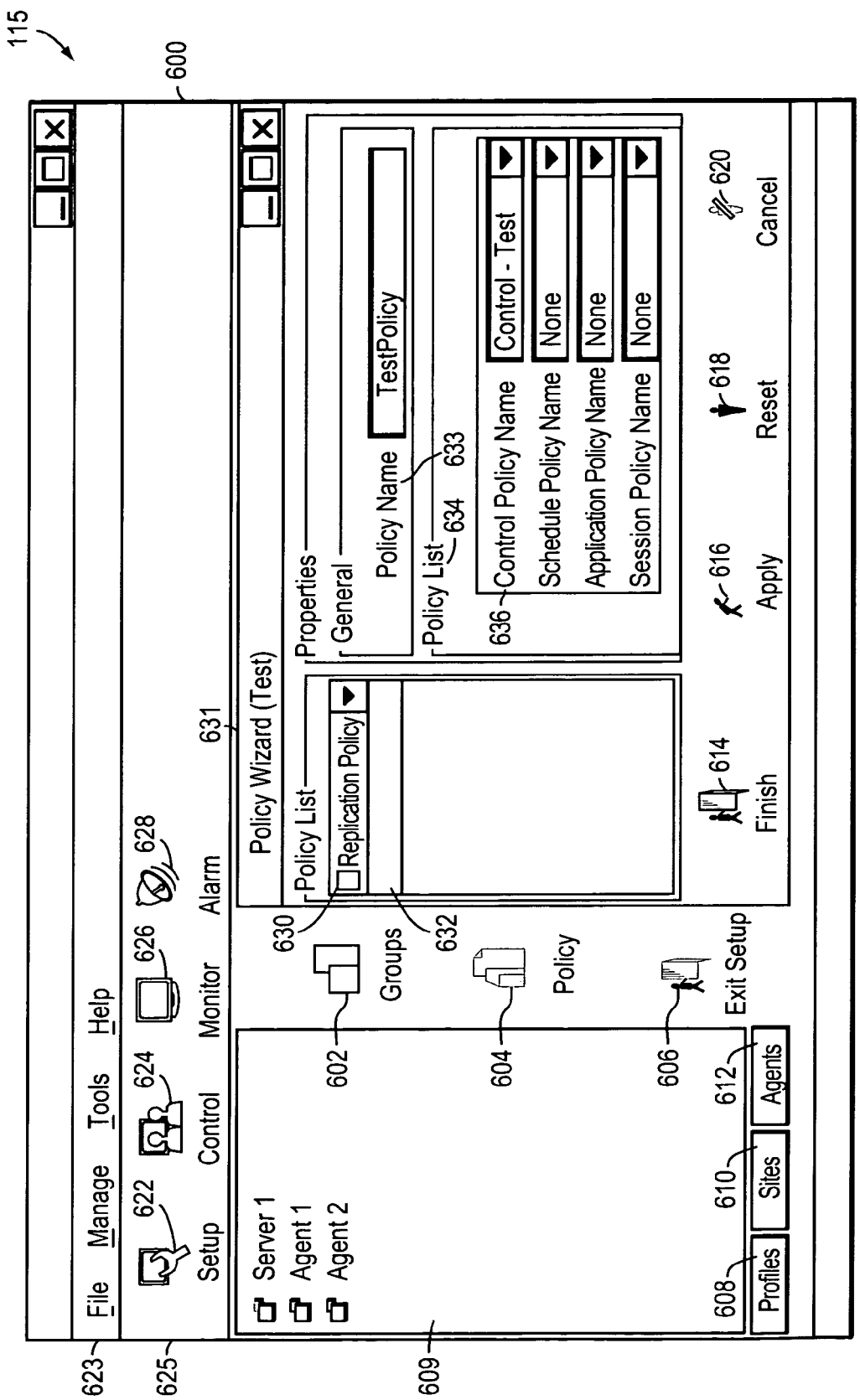
FIG. 14B shows another example of an arrangement of a GUI screen useful as a GUI of the system of FIG. 1 and for implementing the method steps of FIGS. 6–9.

Referring still to FIG. 14B, after clicking on the Policy Icon 604, a Replication Policy menu bar 630 allows such a policy to be assigned to any grouping level. Policies assigned to the lower level groups override policies assigned to upper levels. A Replication Policy controls how the replication is accomplished.

One or more of the following policy areas can be assigned to a Replication Policy: Control, Schedule, Application, and Session, shown respectively by fields in menu pull down 632. In general, the steps to create a Replication Policy with a Wizard-type tool are to define the individual policy areas and create a replication Policy by associating policy areas to the Replication Policy. Such definition includes defining the following groups and assigning a Replication Policy (if required) to each of the following Groups: Device Groups; Replication Groups; Host Groups; and Application Groups (FIG. 10).

Next the user or administrator (these two terms are used interchangeably herein for simplicity) may use the GUI and preferably with a Wizard-type tool which in this example is named "Test" to give ease of use to create a Control Policy that determines the behavior of the replication. For identification, a Policy Name TestPolicy in this example, is created by using policy name field 633 in association with the Test Policy Wizard.

The Control Policy, named Control_test in the example shown in FIG. 14B, may be named with the following example steps: access a so-called Policy Wizard that is part of the invention software, pull down menus through the GUI and select Control Policy, then click on new. In the policy name field 633, the user would enter a unique name for the Control Policy and press enter. Such similar steps are understood to be followed with similar type steps involving policy and groups and using GUI's and/or Wizard-type software tools for purposes of this document and therefore such detail will be generally omitted for the sake of simplicity.

Figure 14C:
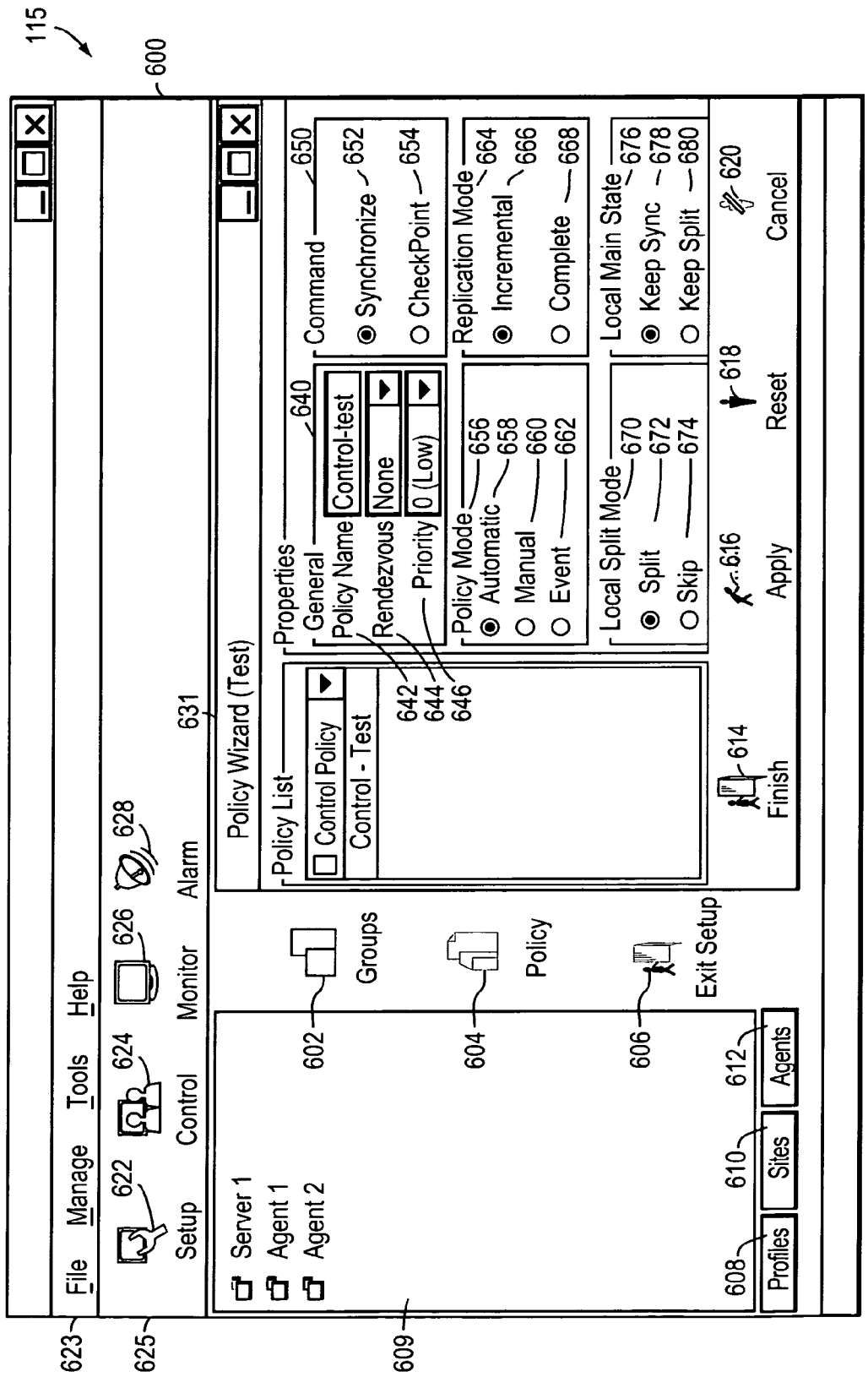
FIG. 14C shows another example of an arrangement of a GUI screen useful as a GUI of the system of FIG. 1 and for implementing the method steps of FIGS. 6–9.

Referring to FIG. 14C, defining Control Policy is further illustrated by example. After entering the unique name for the Control Policy (appearing at field 642) the user would select the Rendezvous Option in the General screen area 640 and by using field 644 and select one of the following options: Local and Remote, and with All or None selected.

In local mode all of the local Device Groups in the group with this policy must reach the same state in the replication process before continuing to the next step in the operation. In remote mode all of the remote Device Groups in the group with this policy must reach the same state in the replication process before continuing to the next step in the operation. Further selecting All Device Groups, (local and remote) in the group with this policy must reach the same state in the replication process before continuing to the next step in the operation. If None is selected then the devices in this group are not required to reach the same state in the replication process before continuing to the next step.

Next the user would select the Priority Level using field 646 for the Replication Group. Different priority levels may be assigned to Replication Groups ranging from for example 0 (lowest priority) to 6 (highest priority). Command options appearing in field 650 include Synchronize appearing at field 652 for synchronizing the desired devices and at field 654. CheckPoint which allows multiple point-in-time copies of the STD devices to be stored on local BCV devices, remote BCV devices, or both.

Next the user may select the Policy Mode in screen area 656. The Policy Mode controls how the replication is run. Options appearing respectively at fields 658, 660, and 662 include: Automatic—Replication process starts automatically; Manual—Replication process starts manually; and Event —Replication process starts based on a predefined system event.

Next the user may select the Replication Mode at screen area 664. For the Replication Mode, the user may use fields 666 and 668, respectively, to select one of the following options: Incremental—Copies only changed tracks (re-establish); and Complete—Copies all tracks (full establish).

Next the user may select the Local Split Mode in screen area 670, which is relevant to the preferred embodiment using BCV's (FIG. 2) and may not be directly apply to mirroring type devices other than such types, but which are still within the scope and spirit of the invention. There are two choices for Local Split mode available for selection at respective fields 672 and 674: Split—the DRM Server splits the local devices automatically; and Skip—the DRM Server does not split the local devices (the user would need to provide a script that splits the local devices in such a case).

Next the user may select the Local Pair State in screen area 676, where there are two choices available for selection at respective fields 678 and 680: Split—the DRM Server splits the local devices automatically; and Skip—the DRM Server does not split the local devices (the user would need to provide a script that splits the local devices in such a case).

Figure 14D:
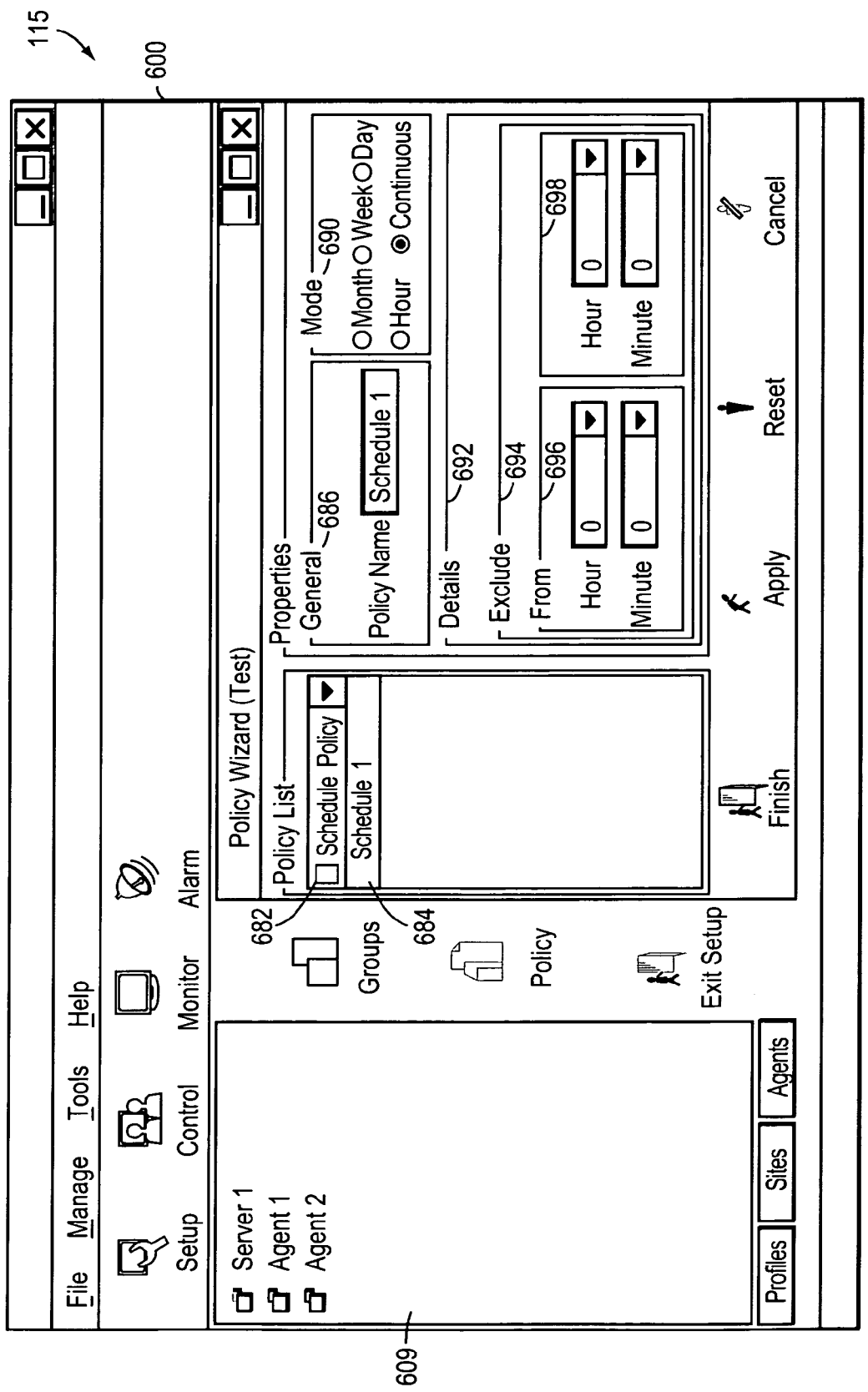
FIG. 14D shows another example of an arrangement of a GUI screen useful as a GUI of the system of FIG. 1 and for implementing the method steps of FIGS. 6–9.

Referring to FIG. 14D, after following the above steps, the user would create a Schedule Policy using menu bar 682, named Schedule1 in the example shown at field 684 and also appearing in General screen area 686. A Schedule Policy determines how often replication occurs. One defines using the GUI by creating a new Schedule Policy and selecting the options based on the Schedule mode. Preferably a new Schedule Policy is created by using the GUI to access a Policy Wizard (similar to that described above) then selecting the appropriate choices and naming the policy. Next it is important to define the time or frequency of replication, e.g. monthly, weekly, daily, hourly, or continuous, in the mode field 690. Conveniently, exclusions may be made in the Exclusion screen area 694 which is part of the Details screen area 692 and which includes From and To screen areas 696 and 698, respectively.

The above example is typical of how the GUI 115 and Screen 600 may be used for using groups and policies with this invention. Other examples and general explanations are given below, but for the sake of simplicity examples of specific screen presentations are generally not given since it will occur to one skilled in the art how to implement such in view of the examples already given and the teachings herein.

Application Policies may control external applications with user-defined scripts that are executed on certain event states. Such event states include: PreSync—The state before devices become established; PreSplit—The state before devices split; PostSplit—The state after devices split; and PostSplit Complete—Triggers an Event for another Group.

In order create a new Application Policy, the user follows similar steps as described with other policies using the GUI and Wizard-type software tool. After the Application Policy is named then the user should create appropriate Rules, including naming the rule and specifying where the rule scripts reside denoted as Rule Location. Rule Locations may include these selections: Local—Specify the host on the local side of the Replication; and Remote—Specify the host on the remote side of the Replication. The host should be identified by its unique name of IP address of the host where the scripts reside. In the Event list, the user should select an event state (e.g. from a drop-down box on the GUI) that is used to initiate the script (the options are described above). A Session Policy should be used to define the duration of a replication.

A Replication Policy controls the behavior of the replication process for a group and may contain a Control, Schedule, Application, or Session Policy. A user may use the GUI to associate one, some, or all of these policies with a Replication Policy. For example, a Replication Policy might contain a Control, Schedule, and Session Policy but no Application Policy. A Replication Policy may or may not be associated with any grouping level. A lower level group's Session Policy will override a Session Policy assigned to a higher level group. For example, if a replication had an Application Group with a Session Policy of 3600 and a Host Group with a Session Policy of 7200, the replication would have 7200 seconds to complete before the replication would abort. Replication Policies are created and named in a similar fashion as other policies. Individual policies may be included in the Replication Policy to add another level of granularity.

Recall there are six group types: Logical Device Group—Consists of either a BCV Device Group or an RDF Device Group; Replication Group—Consists of BCV Device Groups and RDF Device Groups; Host Group—Consists of Replication Groups Application Group—Consists of Host Groups; CheckPoint Device Set—Consists of a BCV device or a group of BCV devices; CheckPoint Device Set Group—Consists of CheckPoint Device Sets.

The user may use the GUI to select the Data Storage Systems such as the preferred EMC Symmetrix Systems for managing with this invention. Multiple systems, such as system 119 and 149*a–b* with applications that span across many systems may be managed.

Figure 14E:
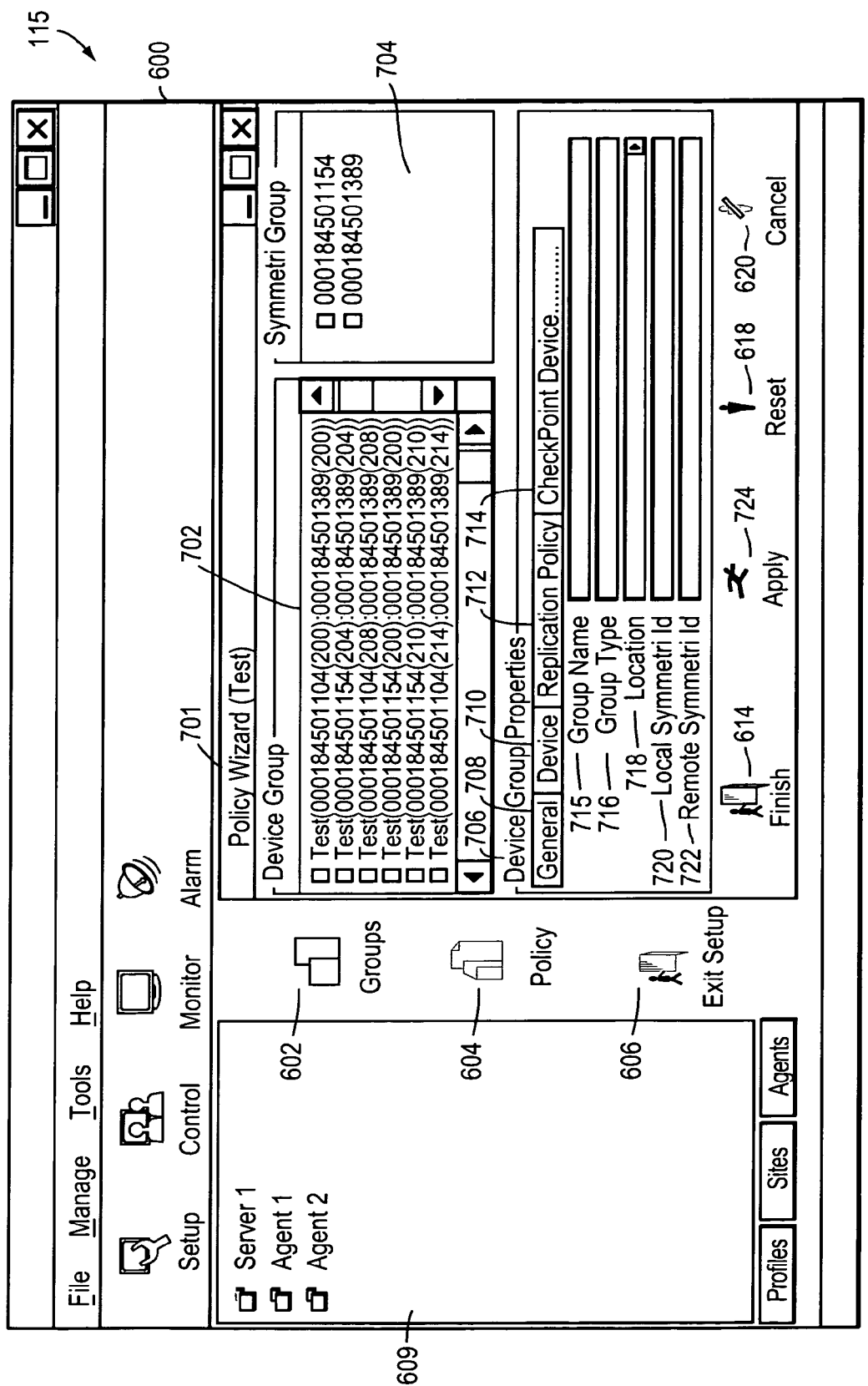
FIG. 14E shows another example of an arrangement of a GUI screen useful as a GUI of the system of FIG. 1 and for implementing the method steps of FIGS. 6–9.

As illustrated in FIG. 14E, a wizard type tool, such as a so-called Groups Wizard through the GUI 115 and screen 600 may be used to select the Data Storage Systems one may want to manage with the following example steps: (1) clicking Groups using icon 602, wherein a window 702 appears showing the serial numbers of the available and managed Data Storage Systems for this site; (2) Select the Data Storage Systems desired to be managed from the available list and add to the managed list appearing in window 704.

After selecting the Symmetrix systems the user may be given the option to create a Checkpoint Device Set that allows point-in-time copies of data from selected STD devices. It is recommended that the user select as many BCV devices as there are STD devices for a particular application or file system. The user should choose Local if the BCV devices are on the local Symmetrix system or select Remote if the BCV devices are on the remote Symmetrix system. The devices in each CheckPoint Device Set must be either all from the local Symmetrix system or all from the remote Symmetrix system.

Once CheckPoint Device Sets are defined the user may use the GUI to create a CheckPoint Device Set Group (a grouping of CheckPoint Device Sets). For example for three point-in-time copies of a database, one would need three CheckPoint Device Sets associated with one CheckPoint Device Set Group. Each CheckPoint Device Set in such a group must have the same number and size of devices. The CheckPoint Device Set Group will be associated with either a device, replication, host, or Application Group depending upon the configuration.

A Logical Device Group (herein interchangeably defined as simply a Device Group) contains user-specified Symmetrix devices. A Device Group provides control, status, and performance data on collective devices within the Device Group. A Device Group defines which STD device will be synchronized with another device. Once the Device Group is named then the user should select a Location. The location determines control of the replication. There are three options: local, intermediate, and remote. If Local is chosen then from a control standpoint, this is local volume. One of the devices in the Device Group is physically attached to the local host and there is one local Device Group per Replication Group. If Intermediate is chosen then from a control standpoint this is the middle staging device in the process. For example, any Device Group that is not local or remote is intermediate. There can be multiple intermediate Device Groups per Replication Group. Finally if Remote is chosen, then from a control standpoint this is the final target destination in the replication. There can be multiple remote Device Groups per Replication Group.

A Replication Group consists of Device Groups grouped together in order to be managed as a single object. For example, when one manages data replication from local, through intermediate, to remote devices as one transaction (e.g. a database transaction).

Referring again to FIG. 14E, a user may use the GUI and Wizard-type tool to configure Replication Groups by using Device Group Properties screen area 706: specifying a name for the group in Group Name Field 754; selecting the type in field 716; selecting which Device Groups are in the Replication Group using menu button 710; and assigning a Replication Policy to the group using menu button 712; and selecting Checkpoint DeviceSet Group using button 714. Location of the Group is designated in field 718 and respective ID's for Local and Remote Data Storage Systems are placed in fields 720 and 722. A Skip icon 724 accompanies the usual other control icons for flexibility using screen 600 for defining Groups.

Once Replication Groups are defined then the user may create Host Groups. A Host Group is a collection of Replication Groups for controlling devices. One Host Groups are named then the user uses the GUI and Wizard to select which Replication Groups are in the Host Group and assigns a replication Policy to the group.

After Host Groups are created then the user may create an Application Group or Groups using the GUI and a Wizard-type software tool. An Application Group is a collection of Host Groups for another level of granularity for controlling devices. Once named, then the user selects which Host Groups are in the Application Group, enables Consistency Groups within the Application Group, assigns a Replication Policy to the Application Group; and assigns a CheckPoint Device Set Group to the Application Group.

Once the user has set up the site including policies and groups, then a Profile may be created (See FIG. 6,). A profile is a record of the schedule, monitor, trigger, and system log filter list that a user defines. Once a profile is created, a user may schedule a replication, monitor a replication using monitor icon 626 for access of a monitor console, view system logs, define events, and set triggers for notification from a Alarm console through Alarm icon. Once the GUI is used to name the Profile using Profiles button 608, the user may associate with it several lists including Schedule, Monitor, and Trigger Lists. A Schedule and Monitor List each contain the groups for which replication is scheduled and/or to be monitored. The Trigger List contains the triggers defined by a user for replication and notification.

The user may use the GUI to define a Trigger which is an association between a system event and a user group. When a specified event occurs, the DRM software notifies all users belonging to a specified user group. Once defined, a trigger is saved as an element of the profile and reused. System events must be defined before one may define a trigger. A system event is an occurrence that may or may not require a response from a user, depending on its severity. The user may monitor replication to follow the progress of a selected scheduled group by loading a profile containing the proper information as described above.

Presented below is an example of implementation of the invention for replicating a database application which in this example is a well-known Oracle database application is now presented. It will be apparent to those of skill in the art that any application, and any database application in particular could also be used in a similar fashion with some straight forward application-specific adjustments.

This section provides a brief exemplary overview of the terms used to describe the replication process and the requirements for setting up the replication. For the purposes of database replication the following terms are important. A source or primary database is where production (commercially active in-use) data resides. This provides the base data in the replication transfer. On the other hand a target or standby database is where the production data is replicated or copied from the source. It is a good choice to locate the physical target site is usually remote or away from the source site. The source and target sites can be thousands of kilometers or miles apart. An example of a scenario for which sites being far apart is advantageous is the preparation for disaster recovery, e.g. earthquakes.

Both the source and the target system should have the same version of Operating System (OS) installed. Both the source and the target system should have the same version of database software such as Oracle installed and should be configured identically. The Oracle software can be installed on both systems separately, or one can use the software of this invention to replicate the source setup database software to the target.

A minimum of three different volume groups are required for each database, one for application data (which contains more static information, such as Oracle software), one for data about Oracle database files, and one for archive log files and control files. For use on the preferred Symmetrix, EMC Corporation of Hopkinton, Mass. can provide any additional host configuration scripts that may be needed to prepare for the replication.

This basic Oracle Database replication example comprises the replication of one source database onto one target database. Some general knowledge of databases is helpful for better understanding this example and may be obtained from product literature available from Oracle Corp. of Redwood City, Calif. Both the source and the target databases need to be configured in archive log modes. Replication should be executed periodically, for example, every 30 minutes or every day at 12 pm, depending on business requirements. The replication can be configured through the methods described generally above.

On the source side, the processes involved are: (1) put the Oracle database into hot backup mode to enable the split BCV volume of the volume containing the data files to be a point-in-time copy of date files; (2) split the BCV volume containing all of the Oracle data files; (3) take the Oracle database out of hot backup mode, then force the log switches and back up the control file to trace; and (4) replicate the data files and the archive logs to the target side.

On the target side, the processes involved are: (1) shut down the database; (2) synchronize the data files; (3) recover the database using control files and archived redo logs; (4) and startup the database.

A more advanced example of Oracle database replication is now given. In this example the replication comprises a source database onto a target database as described in the basic replication scenario, but involves one source database and three target databases. The source and target databases need to be configured in archive log modes, except for the Master database as described below.

Preferably, replication is executed periodically, for example, every 30 minutes or every day at 12 pm, depending on business requirements. The replication scheduling can be configured as described above. This scenario provides an advanced solution for Oracle replication that allows the target site to be available for query instead of only being used as an idle database as in the basic replication scenario. This enables one to use another database for report generating, user queries, etc., which helps to reduce the load on the production (Source) database and thus provides important advantages of prior art systems which do not provide such capability with such flexibility and convenient easy to use features.

The first database, (named Master in this example), is up and running at all times and serves as a window for end-user access. The Master database does not physically contain the production data (and hence has minimal storage requirements). It does not need to be in archive log mode. The Master database is linked to one of the two underlying databases at any given point in time. The underlying databases are target databases replicated from the source site.

The Master database points/links to the two databases (Toggle1 and Toggle2 in this example) in a toggling fashion. While the database replication is replicating the current source database to Toggle1, Toggle2 is up and linked to the Master for the user to access. Once the replication of Toggle1 is done, it is brought up and the "pointer" of the Master database is switched from Toggle2 to Toggle1. The next round of replication begins and the database replication transfers the current source database to Toggle2, while Toggle1 is up and linked to the Master for the user to access.

Once the replication of Toggle2 completes, it is brought up and the "pointer" of the Master database is switched from Toggle1 to Toggle2.

One may create the database links pointing from the Master database to the two toggling databases by running the following example SQL scripts within the Master database.

SQL Script Table drop public database link TOGGLE1;
drop public database link TOGGLE2;
create public database link TOGGLE1 connect to username
identified by password using 'tns:TOGGLE1';
create public database link TOGGLE2 connect to username
identified by password using 'tns:TOGGLE2';

Once the database links are set up in the Master Database, it is best to set up public synonyms for all of the objects in the Production database. The scripts for creating the public synonyms are built into the SDMM scripts. Due to the toggling nature of the database replication, there is an instance in time that the synonym pointer is being switched from one database to the other. If a user session attempts to access an object at that instant, an Oracle error may be returned indicating a requested object link (e.g. table or view) does not exist. However, this may be worked around by rerunning the query or masking off this error message during replication.

The target site for this toggling solution requires at least two volume groups for Toggle1 (one for Oracle data files and one for archive logs and control files); and at least two volume groups for Toggle2 (one for Oracle data files and one for archive logs and control files), plus separate volume groups for the Master database.

In summary and as stated above, an advantage provided by the present invention is related to ease of use, and granularity of control. With regard to database replication the invention provides the same advantages as well as the advantage of establishing a replicated database which may be used to offload overhead on the productions database.

A system and method has been described for managing replication of data in a data storage environment. Having described a preferred embodiment of the present invention, it may occur to skilled artisans to incorporate these concepts into other embodiments. In particular other advantages and implementations of this invention may occur to one skilled in the art that are outside of the preferred embodiments or examples given. Nevertheless, this invention should not be limited to the disclosed embodiment, but rather only by the spirit and scope of the following claims and their equivalents.

What is claimed is:

1. A method for managing data replication of a database in a data storage environment, the method comprising the computer-executed steps of:

providing a first data replication management (DRM) agent which is in communication with a first data storage system, and wherein the DRM agent is configured to manage replication of a database in accordance with one or more replication policies that use groups of mirrored logical volumes that store data associated with the database to be replicated, the one or more replication policies comprising a control policy, the control policy being assignable to a first grouping level and the same control policy also being assignable to a second grouping level.

2. The method of claim 1, wherein the DRM agent is configured to manage the replication of the database so that a copy of the database is replicated to one or more groups of mirrored logical volumes that are located remotely to the first data storage system.

3. The method of claim 2, wherein the DRM agent is configured to manage replication of the database so that a copy of the database is replicated to a third data storage system that is located remotely to the first and second data storage system.

4. The method of claim 1, wherein the control policy includes a policy for controlling replication.

5. The method of claim 1, wherein the replication policy includes a policy for scheduling replication.

6. The method of claim 1, wherein the replication policy includes an application policy for replicating data associated with a specified database.

7. The method of claim 1, wherein the mirrored logical volumes involved in the replication of the database are grouped into one or more logical volume groups and at least one replication policy is assigned to each logical device group.

8. The method of claim 7, wherein the mirrored logical volume groups are further grouped into replication groups and a replication policy is assigned to each replication group.

9. The method of claim 8, wherein the replication groups are further grouped into host groups and a replication policy is assigned to each host group.

10. The method of claim 2, wherein the mirrored logical volume groups are further grouped into remote device (RD) groups and a replication policy is assigned for each RD group.

11. The method of claim 8, wherein the replication policy includes a schedule policy for scheduling when replication may occur, and an application policy for replicating data associated with a specified database application.

12. The method of claim 1, wherein the DRM agent is configured to communicate in accordance with an internet protocol.

13. The method of claim 12, wherein the internet protocol is adhered to by using Java-based code.

14. The method of claim 1, including providing a DRM server in communication with the first DRM agent.

15. The method of claim 12, wherein there is a second DRM agent in communication with a second data storage system that is located remotely to the first data storage system and each DRM Server and DRM Agent is configured so that either the DRM server or the first or the second DRM agent can manage replication of a copy of the database to a second data storage system which is located remotely to the first data storage system.

16. The method of claim 15, wherein on the first data storage system the following steps are included: putting the database to be replicated in backup mode so that a copy of the database may be replicated to logical devices in response to being put in backup mode, logically separating the mirrored logical volumes containing the database copy, taking the database out of backup mode, replicating data files and archive logs associated with the database to the second data storage system.

17. The method of claim 16, wherein on the second data storage system the following steps are included, shutting down the database, synchronizing data files associated with the database, recovering the database using control files and archived redo logs, and startup the database.

18. A networked computer system for managing data replication of a database in a data storage environment, the networked computer system comprising:
- a first data storage system;
- a first data replication management (DRM) agent in communication with the first data storage system;
- a second data replication management (DRM) agent in communication with the first DRM agent;
- a second data storage system in communication with the second DRM agent;
- wherein the first and second DRM agent are configured to manage replication of a database in accordance with one or more replication policies that use groups of mirrored logical volumes that store data associated with the database to be replicated, the one or more replication policies comprising a control policy, the control policy being assignable to a first grouping level and the same control policy also being assignable to a second grouping level.

19. The system of claim 18, wherein the first and second DRM agent are configured to communicate in accordance with an internet protocol.

20. The system of claim 18, wherein the internet protocol is adhered to by using Java-based code.

21. The system of claim 18, including providing a DRM server in communication with the first DRM agent.

22. The system of claim 21, wherein the second data storage system is located remotely to the first data storage system and the DRM Server and the first and second DRM Agent are configured so that either the DRM server or the first or the second DRM agent can manage replication of a copy of the database to a second data storage system which is located remotely to the first data storage system.

23. The system of claim 22, wherein on the first data storage system the following steps are included: putting the database to be replicated in backup mode so that a copy of the database may be replicated to mirrored logical volumes in response to being put in backup mode, logically separating the logical volumes containing the database copy, taking the database out of backup mode, replicating data files and archive logs associated with the database to the second data storage system.

24. The system of claim 23, wherein on the second data storage system the following steps are included, shutting down the database, synchronizing data files associated with the database, recovering the database using control files, archiving redo logs, and starting the database.

25. A program product for managing data replication of a database in a data storage environment, the program product being in communication with a first and second data replication (DRM) agent, each being in communication with a first and second data storage system, the program product including computer-executable logic contained on a computer-readable medium and which is configured for causing the following computer-executed step to occur on the first and second DRM agent:
- replicate a database in accordance with one or more replication policies that use groups of mirrored logical volumes that store data associated with the database to be replicated, the one or more replication policies comprising a control policy, the control policy being assignable to a first grouping level and the same control policy also being assignable to a second grouping level.

* * * * *